(12) United States Patent
Cederlof

(10) Patent No.: US 10,467,811 B1
(45) Date of Patent: Nov. 5, 2019

(54) VISUALIZING CHANGE IN AUGMENTED REALITY ENVIRONMENTS

(71) Applicant: Amazon Technologies, Inc., Seattle, WA (US)

(72) Inventor: Colter Earl Cederlof, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/419,010

(22) Filed: Jan. 30, 2017

Related U.S. Application Data

(62) Division of application No. 13/236,407, filed on Sep. 19, 2011, now Pat. No. 9,595,115.

(51) Int. Cl.
| | |
|---|---|
| *G06T 7/20* | (2017.01) |
| *G06T 19/20* | (2011.01) |
| *G06T 19/00* | (2011.01) |
| *G06F 3/01* | (2006.01) |

(52) U.S. Cl.
CPC ............ *G06T 19/006* (2013.01); *G06F 3/011* (2013.01); *G06F 3/017* (2013.01)

(58) Field of Classification Search
None
See application file for complete search history.

(56) References Cited

U.S. PATENT DOCUMENTS

| | | | | |
|---|---|---|---|---|
| 8,358,342 B2* | 1/2013 | Park | ................... | G06K 9/00771 348/136 |
| 2004/0128102 A1 | 7/2004 | Petty et al. | | |
| 2005/0232466 A1 | 10/2005 | Kampchen et al. | | |
| 2005/0277071 A1 | 12/2005 | Yee | | |
| 2008/0267454 A1* | 10/2008 | Kobayashi | ............. | G01B 11/14 382/106 |
| 2009/0244309 A1 | 10/2009 | Maison et al. | | |
| 2010/0103196 A1 | 4/2010 | Kumar et al. | | |
| 2010/0128110 A1 | 5/2010 | Mavromatis | | |
| 2010/0201787 A1 | 8/2010 | Zehavi | | |
| 2011/0184972 A1* | 7/2011 | Ard | ..................... | G06Q 30/0603 707/769 |
| 2012/0078667 A1* | 3/2012 | Denker | .................. | G06Q 10/02 705/5 |
| 2012/0099765 A1 | 4/2012 | Zheng | | |
| 2012/0117502 A1 | 5/2012 | Nguyen et al. | | |
| 2012/0212509 A1* | 8/2012 | Benko | .................... | G03B 35/00 345/633 |
| 2012/0218406 A1 | 8/2012 | Hanina et al. | | |

(Continued)

OTHER PUBLICATIONS

Final Office Action for U.S. Appl. No. 13/236,407, dated Jan. 5, 2015, Colter E. Cederlof, "Visualizing Change in Augmented Reality Environments", 19 pages.

(Continued)

*Primary Examiner* — Tize Ma
(74) *Attorney, Agent, or Firm* — Lee & Hayes, P.C.

(57) ABSTRACT

An architecture is provided to generate an augmented reality environment and visualize or otherwise output information about changes to a physical object within the environment. The changes may include location, quantity, condition of the physical object, and so forth. Users may also use a rendering of a physical object to plan layout of the physical object in the environment. Prompts may be provided to guide placement of the physical object.

20 Claims, 17 Drawing Sheets

(56) References Cited

U.S. PATENT DOCUMENTS

2012/0223885 A1    9/2012   Perez
2013/0002832 A1    1/2013   Lasenby et al.

OTHER PUBLICATIONS

Office action for U.S. Appl. No. 13/236,407, dated Jan. 21, 2016, Cederlof, "Visualizing Change in Augmented Reality Environments", 24 pages.
Office action for U.S. Appl. No. 13/236,407, dated Jun. 29, 2016, Cederlof, "Visualizing Change in Augmented Reality Environments", 13 pages.
Office action for U.S. Appl. No. 13/236,407, dated Jul. 10, 2014, Cederlof, "Visualizing Change in Augmented Reality Environments", 11 pages.
Office action for U.S. Appl. No. 13/236,407, dated Jul. 29, 2015, Cederlof, "Visualizing Change in Augmented Reality Environments", 21 pages.
Pinhanez, "The Everywhere Displays Projector: A Device to Create Ubiquitous Graphical Interfaces", IBM Thomas Watson Research Center, Ubicomp 2001, 18 pages.

* cited by examiner

VISUALIZING CHANGE IN AUGMENTED REALITY ENVIRONMENTS

RELATED APPLICATIONS

This application is a divisional of U.S. patent application Ser. No. 13/236,407, filed on Sep. 19, 2011, which is incorporated herein by reference.

BACKGROUND

Augmented reality environments allow interaction among users and real-world objects and virtual or computer-generated objects and information. This merger between the real and virtual worlds paves the way for new interaction opportunities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
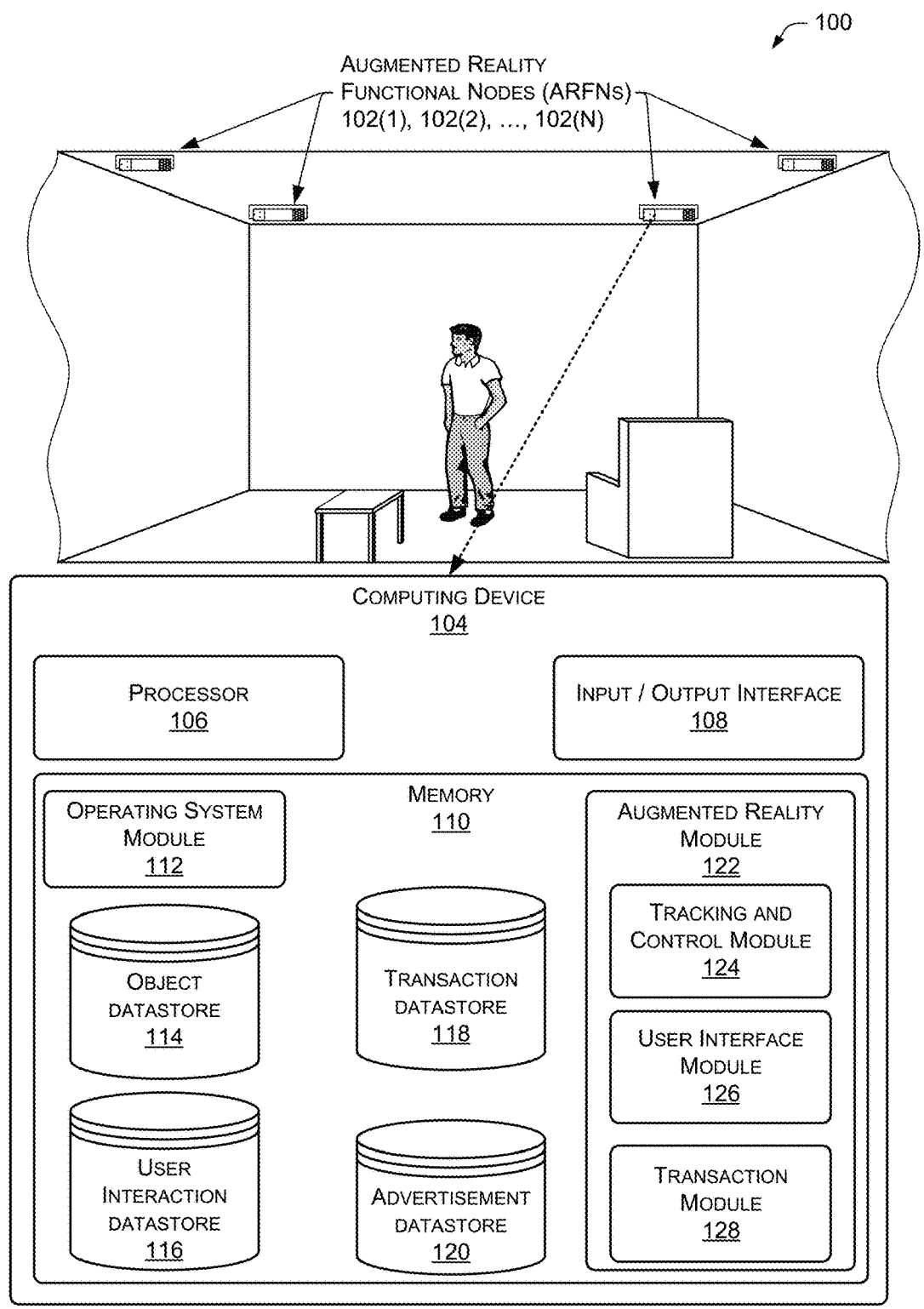
FIG. 1 shows an illustrative scene within an augmented reality environment which includes an augmented reality functional node and associated computing device with an object datastore.

An augmented reality system may be configured to interact with objects within a scene and generate an augmented reality environment. The augmented reality environment allows for virtual objects and information to merge and interact with tangible real-world objects, and vice versa. Disclosed herein are techniques and devices suitable for accessing data about objects stored in an object datastore from the augmented reality environment. This data may be used to determine changes in the physical environment, such as when an object has moved or undergone some physical change. For example, a user may initiate a query to find changes in an object's location attributes over time to determine whether the object is missing from the environment.

The environment may also present users with a rendering of a physical object stored in the object datastore. The environment may also serve to provide prompts for positioning physical objects. For example, the user may access the object datastore to present a rendering of a table, and readily move that rendering about the room with a series of gestures to find a desired location for the actual table. Continuing the example, when brought into the room, the augmented reality system directs placement of the actual table to the desired location.

The augmented reality system includes a computing device configured to support the augmented reality environment. Attributes associated with those objects may be stored in the object datastore. The object datastore may be queried to allow for functionality within the augmented reality environment as described above.

The object datastore may be local to the computing device, accessible to the computing device via a local area network, a cloud or remote resource accessible via a wide area network such as the Internet, or a combination thereof. For example, a local datastore may contain objects which are currently or likely to be in the user's environment while the cloud object datastore may contain aggregated data for many more objects.

The object datastore may be populated by data transfers or by input of information from sensors in the augmented reality environment. Data transfer for attributes of an object may be provided to the object datastore by entities handling goods. For example, upon purchase of an object the merchant may provide a model number and device serial number for inclusion in the object datastore. A shipping company transporting the object may provide a date of acquisition, mass, and overall volume of the object for inclusion in the object datastore. In another example, a manufacturer may provide data about functional attributes.

The object datastore may also be populated by detecting the object in the augmented reality environment at one or more times. Using sensors accessible to the computing device which maintains the augmented reality environment, attributes of the detected objects are determined. These determined attributes may be used to query the object datastore in an attempt to identify the object. When a confidence value of the identification is below a pre-determined confidence threshold, the environment may query a user for assistance in identifying the object or for refined identification. For example, the environment may project an image of an illuminated circle around a detected but unidentified object and ask the user to identify this thing, such as via a speaker and speech synthesis module. The user may provide a refined identification such as "a can of diet Dr. Salt flavored soda" or at least a partial identification or classification such as "a can of soda" to assist the system in further identification. Once the user has made the identification, either refined or partial, the identification may be stored within the object datastore for later use. This later use may include further processing to improved recognition of other objects within the environment, as well as for disambiguation of objects such as those objects which have a partial identification.

The object datastore may include several categories of attributes including, but not limited to, specific object attributes, physical attributes, functional attributes, ownership attributes, and location attributes. Each of these categories, in turn, may store several attributes and sub-attributes. The specific object attributes comprise attributes unique to a particular object. For example, a unique serial number. The physical attributes comprise physical attributes inherent in and presented by the object. For example, the size and shape of the object. The functional attributes comprise functional and operational constraints associated with the object, such as those which affect use of the object. For example, intended uses and safety parameters. The ownership attributes comprise property rights associated with the object. For example, user Alice owns the object and may freely sell or lease it. The location attributes comprise location data of the object. For example, the current location of the object in the augmented reality environment. The object datastore and details about the various attributes are discussed in detail below.

As described herein for illustration and not by way of limitation, the augmented reality environment may be provided at least in part by a combination of a structured light source, such as an image projector or other light source configured to generate structured light patterns and a camera to image those patterns. The projector and camera may further be incorporated into a single unit and designated as an augmented reality functional node (ARFN). In other implementations, other combinations of elements such as projectors, video displays, computer screens, cameras, microphones, ultrasound transducers, depth-sensing devices, weight sensors, touch sensors, tactile output devices, and so forth may be also be present within or coupled to the ARFN. For convenience, and not by way of limitation, the examples in this disclosure refer to the use of structured light for the characterization of the physical environment of the scene including objects therein. However, in addition to or in place of structured light, other techniques may be used such as light detection and ranging (LIDAR), optical time-of-flight, ultrasonic ranging, stereoscopic imaging, radar, infrared scanning, and so forth either alone or in combination with one another.

Within the augmented reality environment, the ARFN includes an augmented reality module. This module is configured to identify and track objects within the scene, maintain a user interface, and facilitate queries of the object datastore. At least partly in response to a user input or an automated process the augmented reality module may query the object datastore to look for changes in one or more attributes therein. This query may include a comparison between object attributes at a plurality of different times to determine changes over time to objects within the environment. For example, the user may query the environment to output a list of objects missing from the room since yesterday.

The augmented reality module may also query the object datastore to present a rendering of a physical object which is stored in the object datastore. The rendering is readily moved around the environment, allowing the user to easily experiment with different physical locations for the object. For example, the augmented reality module may present a projection of a table which the user is considering buying into the environment. The user may use gestures or other inputs to move the projection of the table to a particular location in the room. When the table is delivered, the augmented reality module may provide prompts instructing the deliverperson to place the table in that particular location.

Illustrative Environment

FIG. 1 shows an illustrative augmented reality environment 100 which includes one or more augmented reality functional nodes (ARFNs) 102(1), 102(2), . . . , 102(N) with associated computing devices. In this illustration, multiple ARFNs 102(1)-(N) are positioned in the corners of the ceiling of the room. In other implementations, the ARFNs 102(1)-(N) may be positioned in other locations within the scene. When active, one such ARFN 102 may generate an augmented reality environment incorporating some or all of the items in the scene such as real-world objects. In some implementations, more or fewer ARFNs 102(1)-(N) may be used.

Each of the ARFNs 102(1)-(N) couples to or includes a computing device 104. This computing device 104 may be within the ARFN 102, or disposed at another location and connected to the ARFN 102. The computing device 104 comprises a processor 106, an input/output interface 108, and a memory 110. The processor 106 may comprise one or more processors configured to execute instructions. The instructions may be stored in memory 110, or in other memory accessible to the processor 106.

The input/output interface 108 may be configured to couple the computing device 104 to other components such as projector, cameras, microphones, other ARFNs 102, other computing devices, other devices within the augmented reality environment, and so forth. For example, the input/output interface 108 may be configured to exchange data with computing devices, cleaning robots, home automation devices, and so forth in the environment. The coupling between the computing device 104 and the devices may be via wire, fiber optic cable, or wireless connection including but not limited to radio frequency, optical, or acoustic signals.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. An operating system module 112 is configured to manage hardware and services within and coupled to the computing device 104 for the benefit of other modules. Modules may be stored in the memory of the ARFN 102, storage devices accessible on the local network, cloud storage accessible via a wide area network, or distributed across a combination thereof.

An object datastore 114 is configured to maintain information about objects within or accessible to the augmented reality environment or users. These objects may be tangible real world objects or virtual objects. Tangible objects include items such as tables, chairs, animals, plants, food containers, printed books, and so forth. Virtual objects include media content such as songs, movies, electronic books, computer generated scenes, media files, and so forth. Virtual objects may include stored copies of those objects or access rights thereto. The object datastore 114 may include a library of pre-loaded reference objects, as well as objects which are temporally persistent within a particular environment, such as a wall, a specific table, a user and so forth. The object datastore 114 or the other datastores described below may be stored on one or more of the memory of the ARFN 102, storage devices accessible on the local network, cloud storage accessible via a wide area network, or distributed across one or more of these. Data within the object datastore 114 may be stored in hierarchical, non-hierarchical, or hybrid arrangements. In a hierarchical structure objects may be classified in a structure which may be taxonomic in nature. For example, an object may be defined in the datastore as inanimate, metal exterior, food, ready-to-eat, beverage, soda, grape flavor. Non-hierarchical systems may comprise systems where apparently arbitrary or variable connections are established between objects. These arbitrary associations may be between physical and virtual objects, such as associating a grouping of digital photos with a small statute of the Eiffel tower. The object datastore 114 is discussed in more detail below in regards to FIGS. 4-9.

A user interaction datastore 116 is configured to maintain information about interactions between one or more users and one or more objects. The user interaction data within the datastore 116 may be used in some implementations to facilitate additional functions such as to receive indications of user selections of advertisements, providing usage data, and so forth. The collection and use of the user interaction data may be limited based upon the preferences of the user. Changes in objects attributes as a result of interactions may be stored in the object datastore 114. For example, when the user moves a pair of sunglasses from one part of the augmented reality environment to another, the previous and current location attributes may be stored in the object datastore 114. The object datastore 114 in some implementations may be configured to store some data as vector, differential, or incremental values. For example, a current location may be given as a series of movement vectors relative to a default start location.

A transaction datastore 118 is configured to maintain information about changes in property rights associated with objects. For example, the datastore 118 may be configured to track the purchase, rental, sale, lease, and so forth of objects. Changes to the ownership rights may update the ownership attributes in the object datastore 114.

An advertisement datastore 120 is configured to maintain information about advertisements available to the augmented reality environment. These advertisements may be designated for presentation based on one or more of the attributes maintained within the object datastore 114. For example, a user bringing an apple into the augmented reality environment may be presented with an advertisement for a prepackaged apple pie the user has previously purchased.

An augmented reality module 122 is configured to generate augmented reality output in concert with the physical environment. The module 122 may access one or more of the datastores described herein. The augmented reality module 122 may include a tracking and control module 124 is configured to identify objects including users. This identification may include the use of a camera, structured light, radio frequency identification equipment, communication with the object, and so forth within the ARFN 102. Objects may be identified as described below by comparing attributes in the object datastore 114 such as shape, text thereon, universal product code (UPC), object behaviors (including an ability to move independently), optical barcode, radio frequency identification tag (RFID), and so forth. Where the object is capable of communication, it may exchange information with the ARFN 102, and such information may be stored within the object datastore 114.

The term object encompasses several categories including unitary, package, group, container, and so forth. As described above, objects may be hierarchically or arbitrarily associated with one another. Some objects may be unitary in that they are complete in and of themselves, such as a baseball bat or wrench. Some objects may be packages containing a plurality of items which may or may not be identical, such as a twelve-can case of cola or set of different sized wrenches. An object may also be a group of closely interrelated sub-objects, which operate together to form a whole, such as a jigsaw puzzle. An object may also be a container holding other objects, such as a filled tote with the significance being the contents of the tote and not necessarily the container itself. Different attributes may be stored for different categories of objects.

The category of an object may be determined at least in part by factors including context, prior use, pre-determined data, and so forth. For example in the context of home use and purchase, wine may be considered a unitary object and designated by the bottle not by the case. Similarly, pre-determined data may indicate that totes are used for storage, and as such a user pointing to a tote filled with objects may be determined as a default to be designating the objects within the tote, and not the tote itself.

A user interface module 126 which may be in the augmented reality module 122 is configured to accept and interpret input and generate output for the user. The ARFN 102 may use a camera, structured light, stereoscopic vision, and so forth to read the input from the user. The user interface module 126 may also include an object datastore query module configured to allow applications to access information in the object datastore 114. For example, a user may query the object datastore 114 to locate his misplaced sunglasses. The augmented reality module 122 may also include a transaction module 128 is configured to associate objects with advertisements, facilitate transactions involving third parties such as buying and selling objects, and perform other functions.

Figure 2:
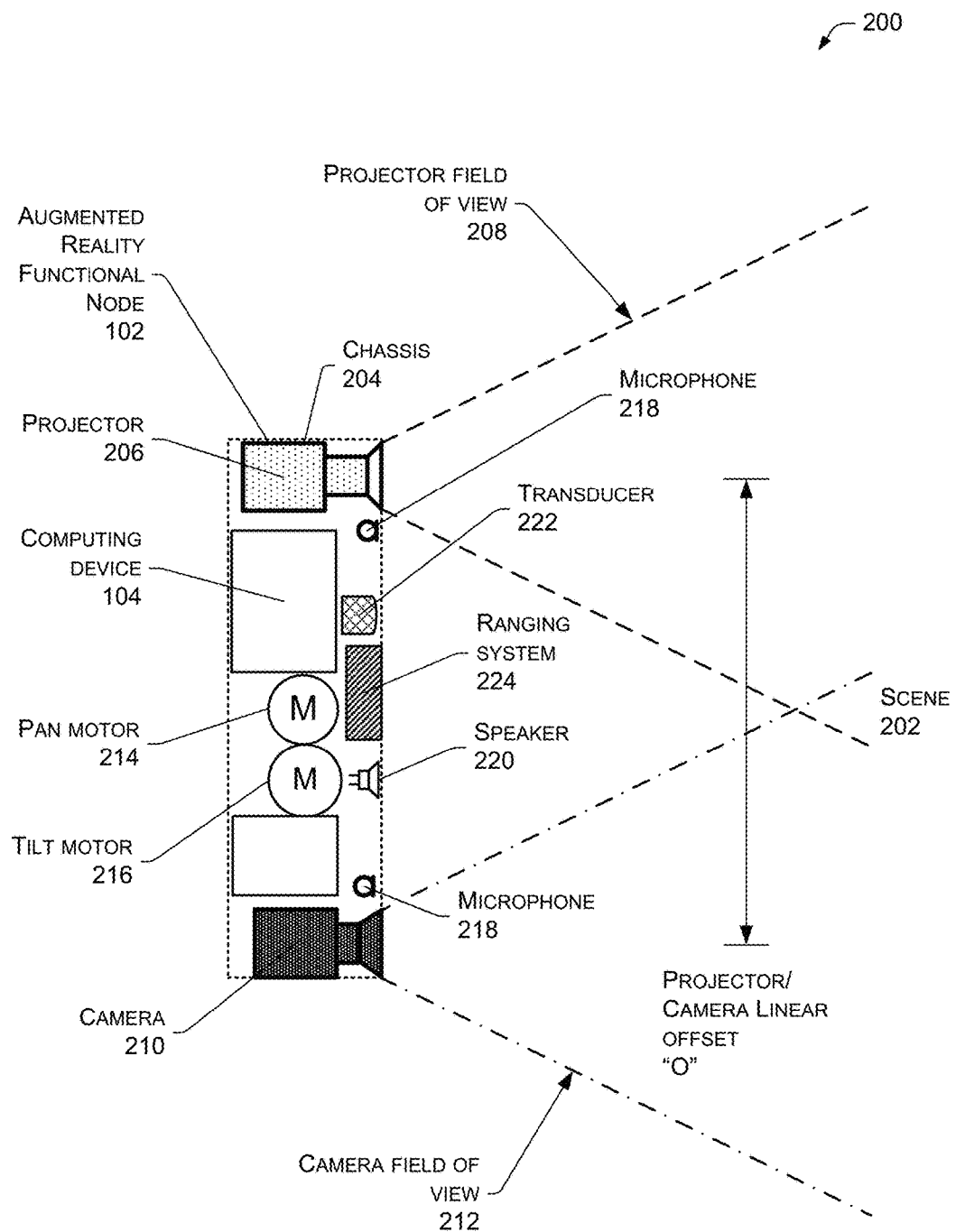
FIG. 2 shows an illustrative augmented reality functional node that includes a computing device, along with other selected components configured to generate and maintain an augmented reality environment.

FIG. 2 shows an illustrative schematic 200 of one example augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 or other displays such as televisions, monitors, and so forth may be used.

A camera 210 may also be disposed within the chassis 204. The camera 210 is configured to image the scene in visible light wavelengths, non-visible light wavelengths, or both. For example, in one implementation the camera 210 may be configured to generate a thermal image as well as a visible light image. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival or other techniques among the microphones.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. For example, the transducer 222 may be configured to detect a characteristic ultrasonic sound signature produced by keys on a keyring. Inaudible signals may also be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
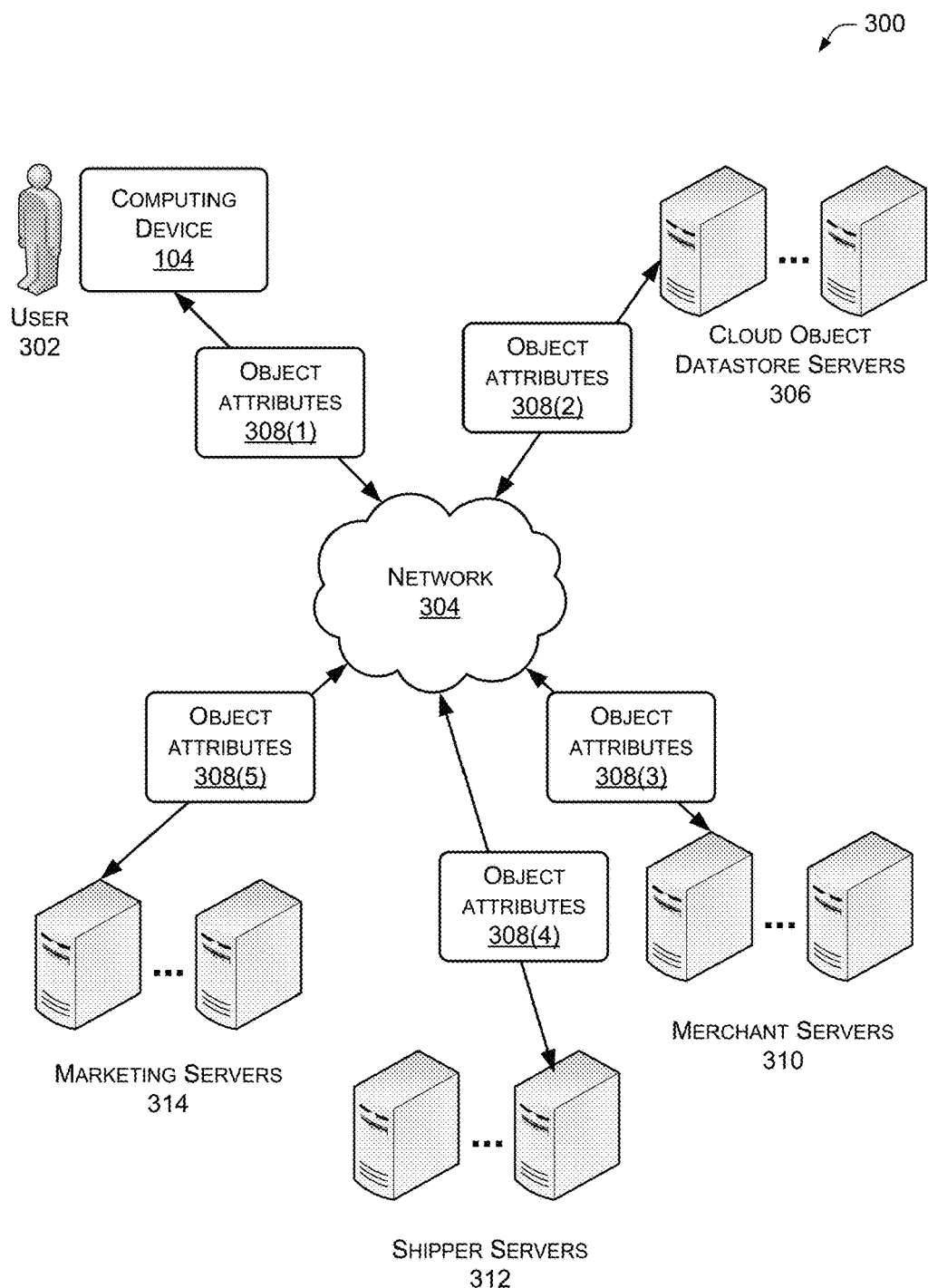
FIG. 3 illustrates an environment encompassing the computing device, users, cloud object datastore servers, merchant servers, marketing servers, and so forth.

FIG. 3 illustrates an environment 300 encompassing the computing device, users, cloud object datastore servers, merchant servers, marketing servers, and so forth. Users 302(1), 302(2), . . . 302(N) may use the computing device 104 in the augmented reality environment or other computing device, such as desktop computers, to access resources via a network 304. The network 304 may include a wide area network such as the internet, private network, local area network, and so forth.

Resources available via the network 304 may include cloud object datastore servers 306. The cloud or remote object datastore may comprise an extended object datastore. Transfers of data such as received from other entities as shipping manifests, inventory data, manufacturing data, and so forth may build this object datastore as described below. The cloud object datastore may also be populated by aggregating at least a subset of the local object datastores from augmented reality environments. Such aggregation may take place after user approval and may include providing data comprising one or more object attributes in the local object datastore to the cloud object datastore. The cloud object datastore servers 306 receive the data and may integrate that data into the datastore. This integration may involve de-duplication, confirmation of identification, analysis of attributes to determine a range of possible values for a given object or class of object, and so forth. For example, the range of possible shapes and colors of apples may be determined from a sample of the attributes of thousands of individual apples across many augmented reality environments.

The cloud object datastore servers 306 are configured to provide data in the cloud object datastore to applications. In some implementations, the providing may comprise maintaining an application programming interface or other service configured to respond to queries against the datastore. For example, an application executing on a given computing device 104 may attempt to identify a detected object and query the cloud object datastore servers 306 to search the larger datastore contained therein. In another implementation a user may access information about an object they are considering for purchase, such as images, shape, and dimensions of a table from the cloud object datastore.

Object attributes 308(1), 308(2), . . . , 308(A) may be transferred via the network 304 between devices. For example, the computing device 104 may transfer object attributes 308(1) for the detected but unidentified object to the cloud object datastore servers 306 for refined identification. In other implementations the cloud object datastore servers 306 or other servers may exchange object attributes 308. For example, merchant servers 310 may provide object attributes 308(2) associated with purchased objects to the object datastore 114 of the computing device 104, cloud object datastore servers 306, and so forth. The merchant servers 310 may include bricks-and-mortar as well as online stores.

Likewise, the merchant servers 310 may request data from the cloud object datastore servers 306 via the network 304 to determine actual usage statistics for an object. For example, the merchant servers 310 may wish to determine how long a toy dump truck is played with before being discarded or having ownership transferred to another user. Such usage information may be useful in product development, marketing, and so forth.

Shipper servers 312 may be configured to couple to the network 304 and exchange object attributes 308 or other data with other devices. A common carrier, freight company, and so forth may maintain or provide logistics-related data to the shipper servers 312 relating to objects. For example, the shipper servers 312 may contain a manifest which lists objects in a given shipment, delivery information, weight, volumetric data, and so forth. The computing device 104 may populate the object datastore 114 by receiving object attributes 308(4) including this manifest data, such that when the user is unpacking the box, the augmented reality environment is able to identify the objects from the set of objects which were packed in the box per the manifest, rather than all objects existing in the aggregated cloud object datastore.

Marketing servers 314 may also access object attributes 308 via the network 304. The marketing servers 314 may be configured to query the object datastore to determine usage patterns, purchasing patterns, and so forth. Such information may then be used to develop marketing strategies. For example, where the augmented reality identifies that the user has a collection of porcelain figurines in his augmented reality environment, advertisements specific to that user's apparent interest in figurines may be provided.

Figure 4:
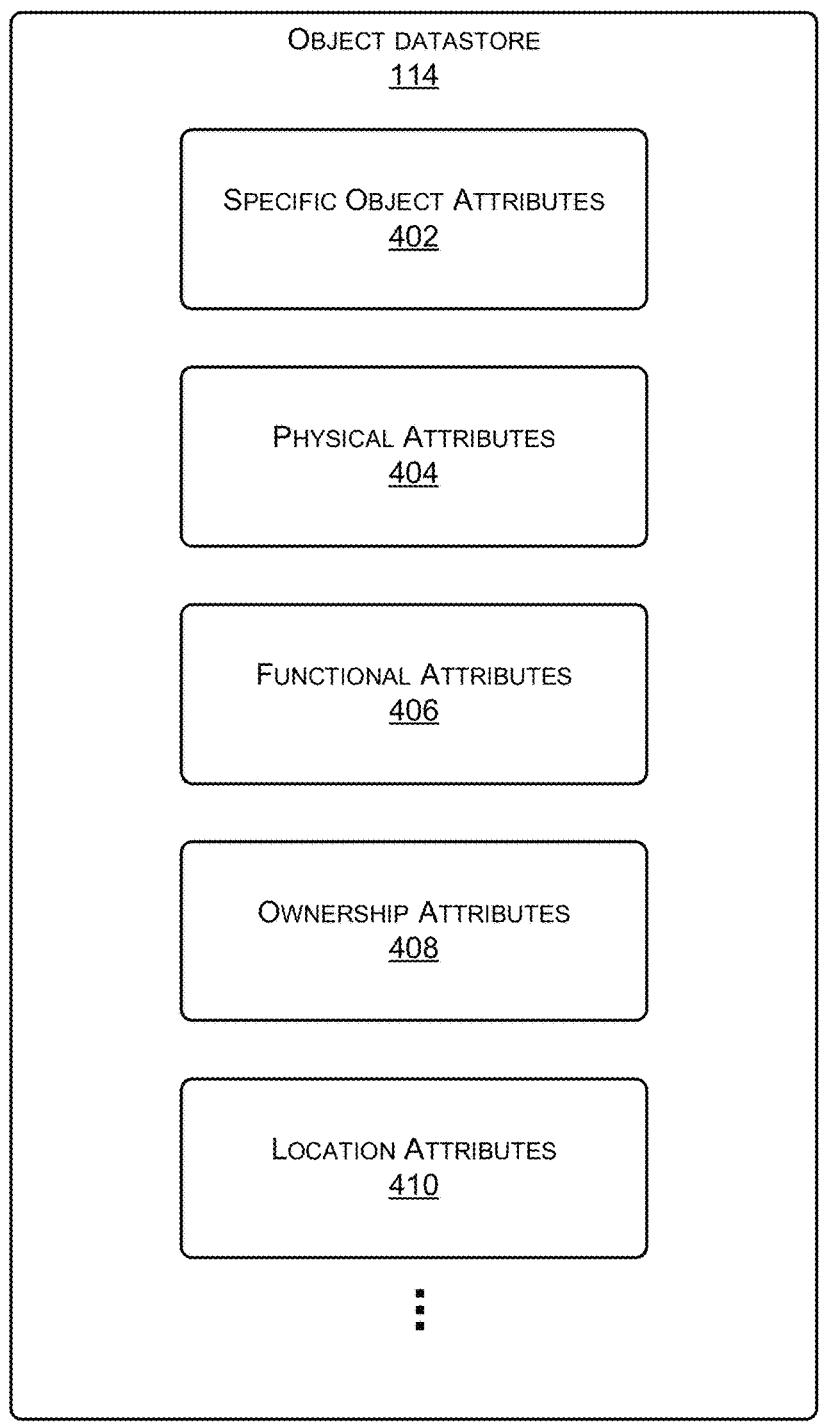
FIG. 4 is an illustrative diagram of an object datastore configured to store information about objects in the augmented reality environment.

FIG. 4 is an illustrative diagram of an object datastore 114 configured to store information about objects in the augmented reality environment. As described above, these objects may be tangible real world objects or virtual objects.

The object datastore 114 may store several categories of attributes including, but not limited to, specific object attributes 402, physical attributes 404, functional attributes 406, ownership attributes 408, and location attributes 410. Each of these categories, in turn, may include several attributes and sub-attributes. These categories are provided by way of example, and in some implementations attributes or sub-attributes may be present in a plurality of categories. The categories are discussed next with regards to FIGS. 5-9.

Figure 5:
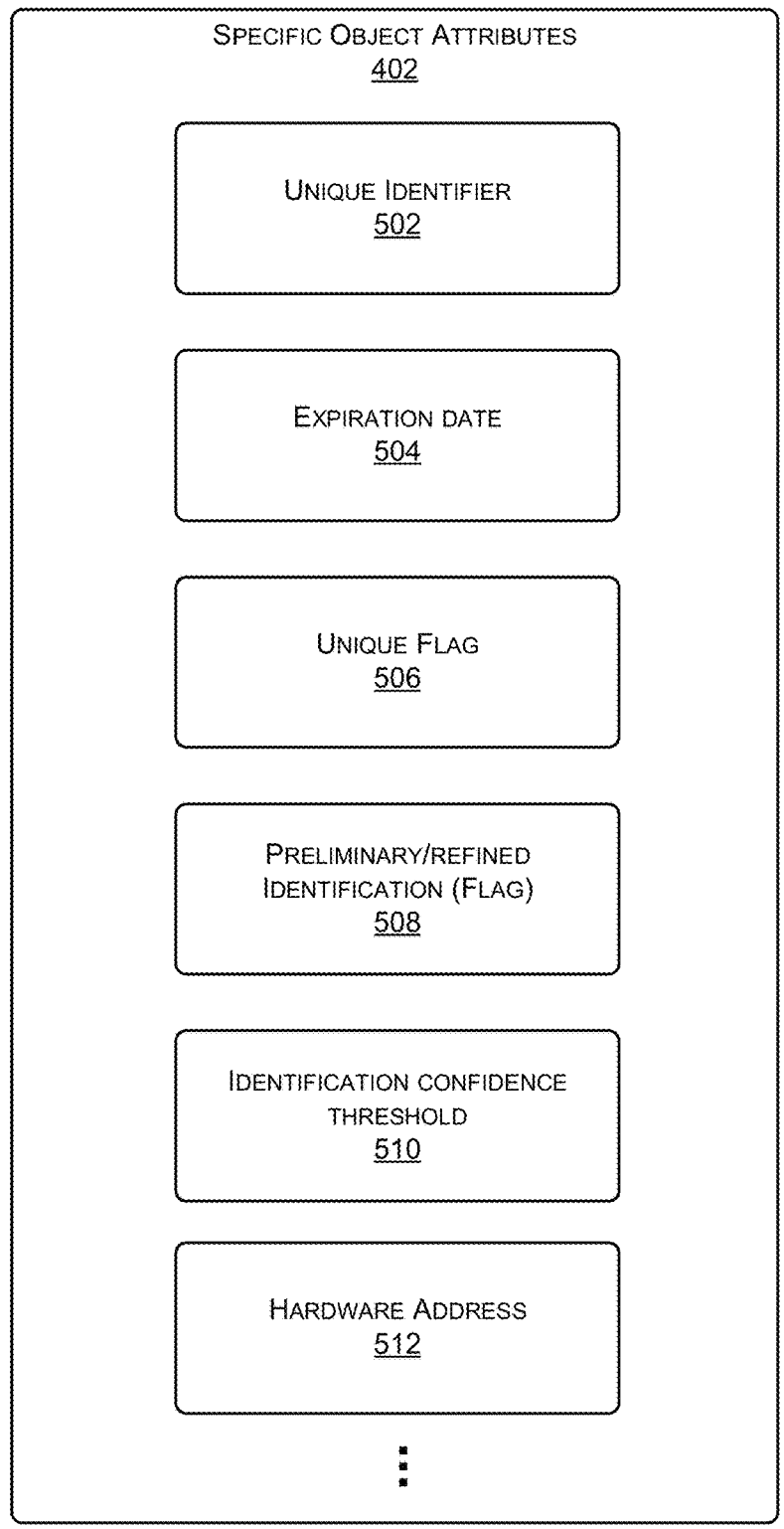
FIG. 5 is an illustrative diagram of specific object attributes in the object datastore in the augmented reality environment.

FIG. 5 is an illustrative diagram of the specific object attributes 402 which may be stored in the object datastore 114 of the augmented reality environment. Generally speaking, the specific object attributes 402 comprise attributes or characteristics unique to a particular object. The following attributes are provided by way of illustration, and not as a limitation.

A unique identifier 502 may be stored. This unique identifier may include a serial number, global unique identifier, and so forth. The unique identifier 502 may be considered to distinguish this object from all other similar or otherwise identical objects. The unique identifier 502 may be embedded within the device, affixed thereto with a label or tag, or otherwise associated therewith. For example, a portable game console may have a unique serial number embedded within its firmware. The unique identifier 502 may be stored on a tag such as an optical barcode or radio frequency identification chip.

An expiration date 504 may be associated with the object. The expiration date 504 is a calendar date or interval after which the object is considered to be degraded or at which time the object becomes unusable. For example, a printer cartridge may be configured to have an operational lifetime and thus expiration date of 120 days after installation in a printer.

A unique flag 506 indicates whether this specific object is considered unique. For example, the unique flag 506 for a custom-made diamond necklace may be "yes" while the unique flag 506 for a pencil is set to "no."

A preliminary/refined identification (flag) 508 may also be present in the object datastore 114. This flag 508 may be used to indicate when the specific object has received a preliminary identification which may be subject to change, or a refined identification which is considered to be absolute.

An identification confidence threshold 510 may also be maintained. The identification confidence threshold 510 indicates a level at which a calculated confidence value for an object is deemed sufficient to warrant the identification. The confidence value may be based on the comparison of one or more attributes of the object with data in the object datastore 114 for other objects, reliability of a user providing the identification, and so forth. An object may also have different confidence thresholds 510. For example, an identification provided by an authorized adult user may be given a 95% confidence threshold while an identification by an unauthorized child user may be given a 20% confidence threshold. The environment may be configured such that objects having a confidence value above a pre-determined threshold confidence threshold are deemed to have a refined identification. Likewise, objects with a calculated confidence value below a pre-determined confidence threshold may be assigned a preliminary identification which may be subject to change as additional data becomes available to the augmented reality environment.

Specific object attributes 402 may also include a hardware address 512 or other data networking parameter. This hardware address 512 may comprise a hardware or media-access control address, and so forth.

Figure 6:
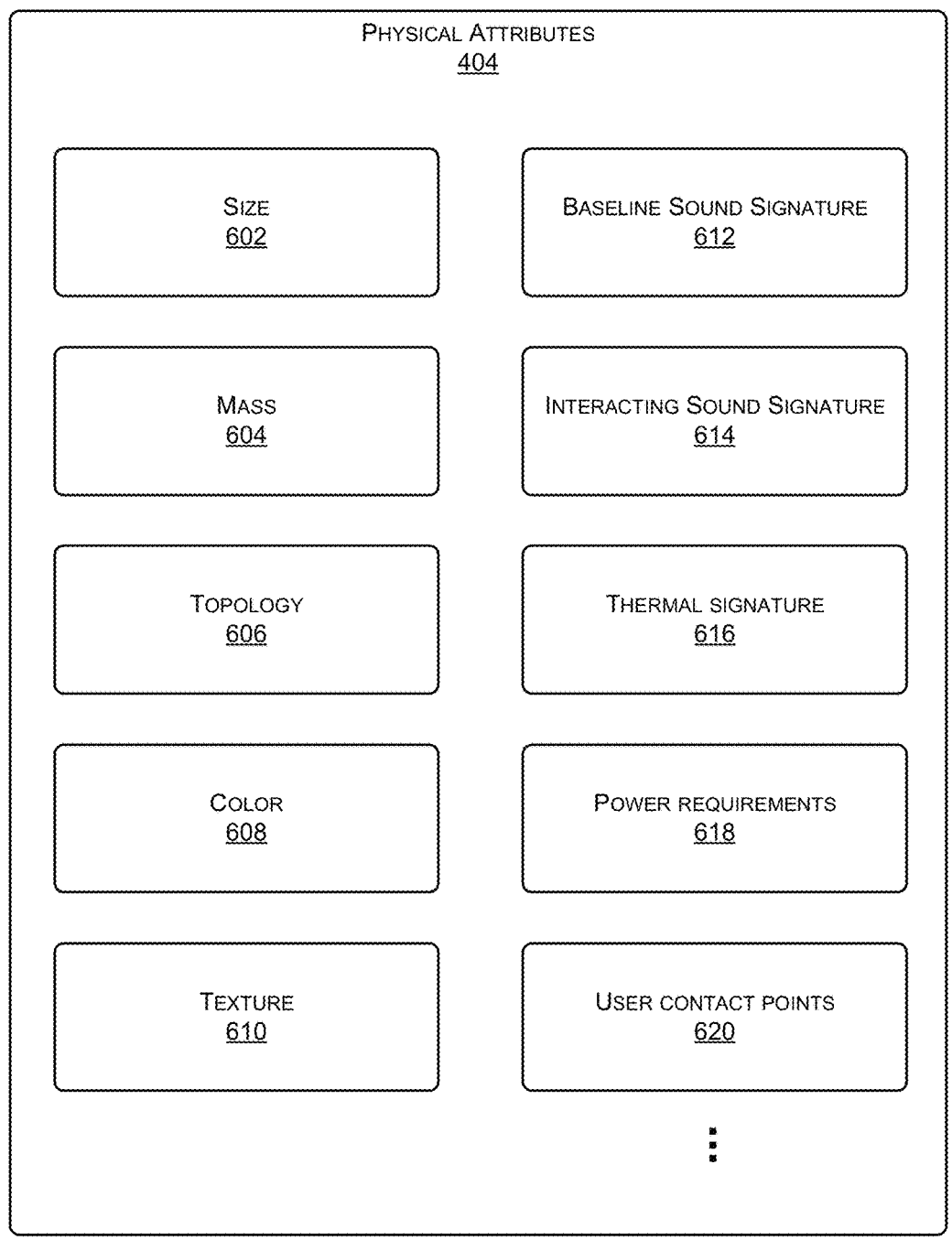
FIG. 6 is an illustrative diagram of physical attributes in the object datastore in the augmented reality environment.

FIG. 6 is an illustrative diagram of the physical attributes 404 which may be stored in the object datastore 114 in the augmented reality environment. The following attributes are provided by way of illustration, and not as a limitation. Broadly speaking, the physical attributes 404 comprise physical attributes inherent in and presented by the object. These physical attributes 404 may be determined by sensors in the augmented reality environment, such as described above with regards to the ARFN 102.

Size of the object 602 may be stored in the object datastore 114. For example, the size may include a volumetric measurement such as the object fits within a cuboid of dimensions 32 cm by 16 cm by 51 cm.

Mass 604 of the object may be stored. In one implementation a pressure sensitive touch sensor or scale in the augmented reality environment may provide an indication of the object's mass. In another implementation, the mass may be acquired from a third-party, such as from a shipper or merchant who is transporting or selling the object.

Topology 606 is a two- or three-dimensional map or representation of a configuration or shape of at least a portion of the object's exterior. For example, the overall topology of a beverage can is that of a cylinder, while the overall topology of a dog is more complex.

Color 608 of the object may also be stored in the object datastore 114. The color 608 may be determined from ambient light or from the interaction of different spectral bands of light as generated at particular times by a wavelength modulated light source. The color 608 may also include sub-attributes such as reflectance values or spectral responses for different spectral bands. In some implementations, the spectral data may be used to characterize the composition of the object.

Texture 610 of the object may acquired and stored as well. The texture of the object is the disposition or arrangement of relatively small scale surface features. For example, the texture of a tennis ball is fibrous while texture of a golf ball is smooth with dimples. Texture may be determined by imaging, a scan such as with structured light or LIDAR, tactile sensor, and so forth. As with any of the attributes in the object datastore 114, many textures 610 may be stored and associated with a given object or set of objects. For example, the texture of a user's face may change as his beard grows.

Baseline sound signatures 612 may also be stored within an object datastore 114. The sound signatures described herein may include sounds audible to the human ear, as well as inaudible sounds such as infrasound or ultrasound. Some objects produce a baseline of specific waveforms. Objects which are electrical or mechanical may produce particular sounds while operating. For example, a particular laptop may produce a distinctive sound due to cooling fans and the particular airflow of that device. Objects which are organic may produce particular sounds such as breathing.

Comparison of the baseline sound signature 612 or waveform may aid in identification a detected object. Returning to the laptop example, a portable computer device which is detected and has an operating fan could not be a portable device with no fan. As a result, the augmented reality environment may limit the search in the object datastore 114 for objects having cooling fans or the baseline sound signature 612 associated therewith.

An interacting sound signature 614 of the object interacting with the environment or users may also be stored. This sound signature 614 results during the object interacting with another object in the augmented reality environment rather than passively sitting there. For example, a key ring full of keys sitting on a table may have no operating sound signature 612. However, a user picking up those keys may cause them to "jingle" and emit a particular sound signature 614. This sound signature 614 may include audible and ultrasonic aspects. Similarly, the user placing the keys on a table may also generate a particular interacting sound signature 614.

Physical attributes 404 may also include a thermal signature 616. This thermal signature 616 may include data which indicates the particular range of temperatures the object is typically expected to have. For example, the thermal signature 616 for a human would be between about 96° Fahrenheit (F) and 105° F. The thermal signature 616 may also be used to distinguish and in some implementations aid in the identification of an object. For example, the augmented reality environment may be able to distinguish a bowl of frozen yogurt from a bowl of pudding based at least in part upon the temperature difference.

The thermal signature 616 attribute may comprise coarse temperature or "spot" measurements such as determined by an infrared photodetector or thermal image data such as acquired from an infrared camera. Where the thermal signature 616 comprises thermal image data, this image data may further be used to characterize an object. For example, thermal images of faces may be used to distinguish one user from another. Or the thermal image of a laptop may serve to distinguish one model from another based on the different relative position of relatively hot internal components such as the processor.

The physical attributes 404 may also include power requirements 618 for the object. Objects which consume electrical power may have their power requirements 618 stored in the object datastore 114. These power requirements may include the operating power requirements, actual power consumption, low power or sleep mode power requirements, and so forth. In some implementations electrical supplies such as a residential or commercial power system may provide for the exchange of data with the augmented reality environment. For example, a "smart grid" electric meter may be configured to provide data to the augmented reality environment. Where an individual object is so equipped, such as a personal computer or laptop, the object may provide data regarding electrical power consumption, requirements, and so forth to the augmented reality environment. In some implementations, a sub-attribute may include thermal power requirements, such as thermal power output during operation.

User contact points 620 may also be maintained. Many objects have a particular shape which is defined by how a user is intended to interact with the object. The user contact points 620 are where a user typically touches or otherwise interacts with the device. By monitoring the interaction of the user with the object in the environment, the user contact points 620 may aid in the identification of an object. For example, a crochet hook may be differentiated from a pencil based on the different contact points 620 resulting from differences in how the user grasps each.

Other physical attributes 404 may be stored as well in the augmented reality environment. For example, smells such as determined by machine olfaction devices may be stored. In another implementation chemical composition may be stored. Or characteristics of magnetic fields generated or distorted by the object as determined by magnetic field sensors may be stored.

Figure 7:
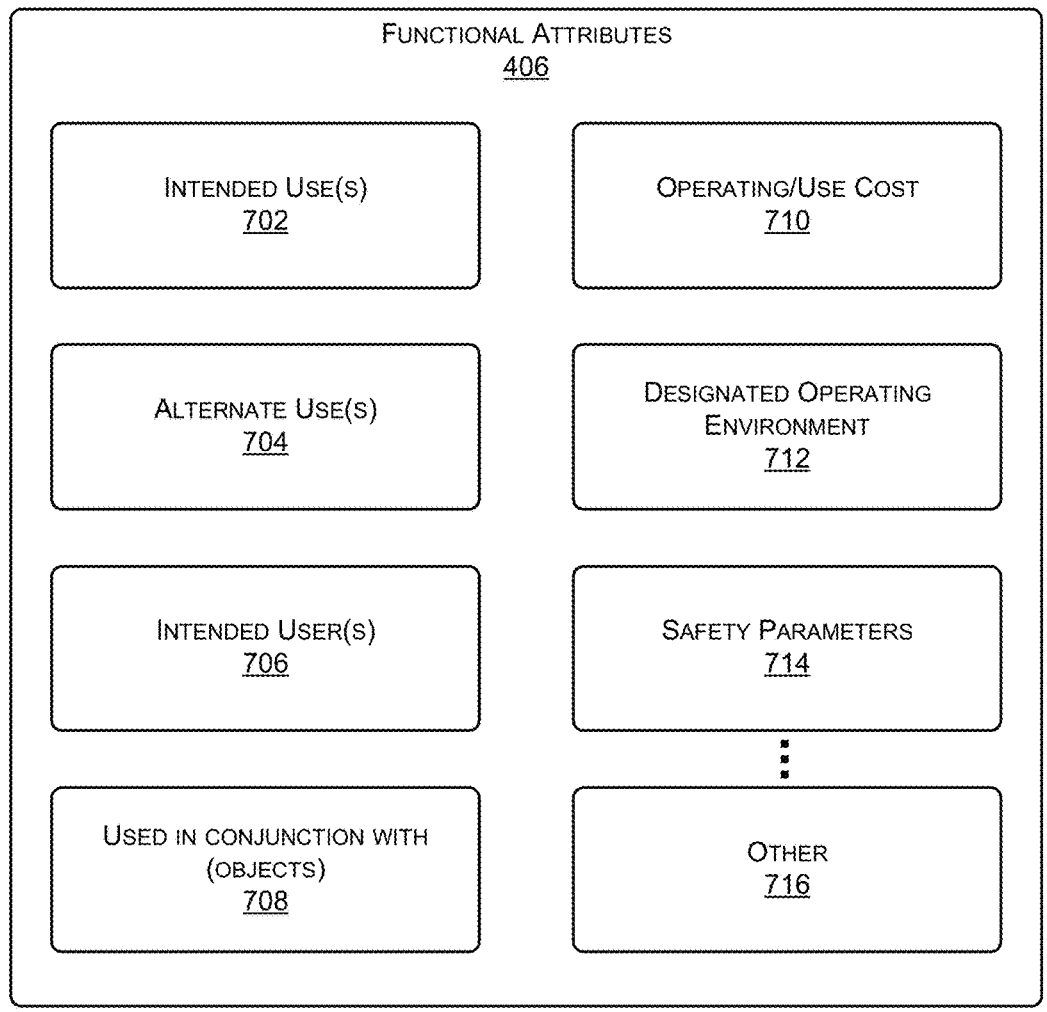
FIG. 7 is an illustrative diagram of functional attributes in the object datastore in the augmented reality environment.

FIG. 7 is an illustrative diagram of the functional attributes 406 in the object datastore 114 in the augmented reality environment. Generally speaking, the functional attributes 406 comprise functional and operational constraints associated with the object.

One or more intended uses 702 may be stored. These are operations for which the object is intended during normal use to be used for. For example, scissors have as intended uses cutting sheets of material including paper, fabric, and so forth.

One or more alternate uses 704 are those operations for which the object may be used, but is not intended to be used for. For example, the scissors may be used to puncture rather than cut.

One or more intended users 706 may be specified. These intended users may be specific individuals or groups of users. For example, the scissors may have as intended users the group of users over age three.

Objects in the augmented reality environment may be used in conjunction with other objects. Objects used in conjunction with 708 are items which may, but need not always, be used together. For example, the scissors may have objects used in conjunction 708 with them of paper, glue, and glitter.

Operating or use cost 710 may be stored in the object datastore 114. This cost may be measured in terms of time, money, resource utilization, and so forth. For example, the operating cost 710 of an electronic game may be 350 watts of electrical power per hour.

A designated operating environment 712 may also be stored. The designated operating environment 712 indicates how and where the object typically is used. The object may be considered more likely to be present in the designated operating environment 712 than in other environments. For example, a laptop object has a designated operating environment 712 which differs from a scrubbing brush object 712 which resides in the kitchen sink.

Safety parameters 714 designate boundaries of a safe operating regime associated with the object. These safety parameters 714 may include safety to users, safety to non-users, safe operation to prevent damage to the object, and so forth. For example, the safety parameters 714 for a particular blender object may indicate that the blender should not operate continuously for more than fifteen minutes to minimize the risk of electrical fire from overheating.

Other 716 functional attributes 406 may also be stored in the object datastore 114. For example, details about consumable components or inputs for the object may be maintained, object behavior, object operation, and so forth. An object category may also be maintained to indicate whether the object is unitary, a package, a group, or a container for other objects.

Figure 8:
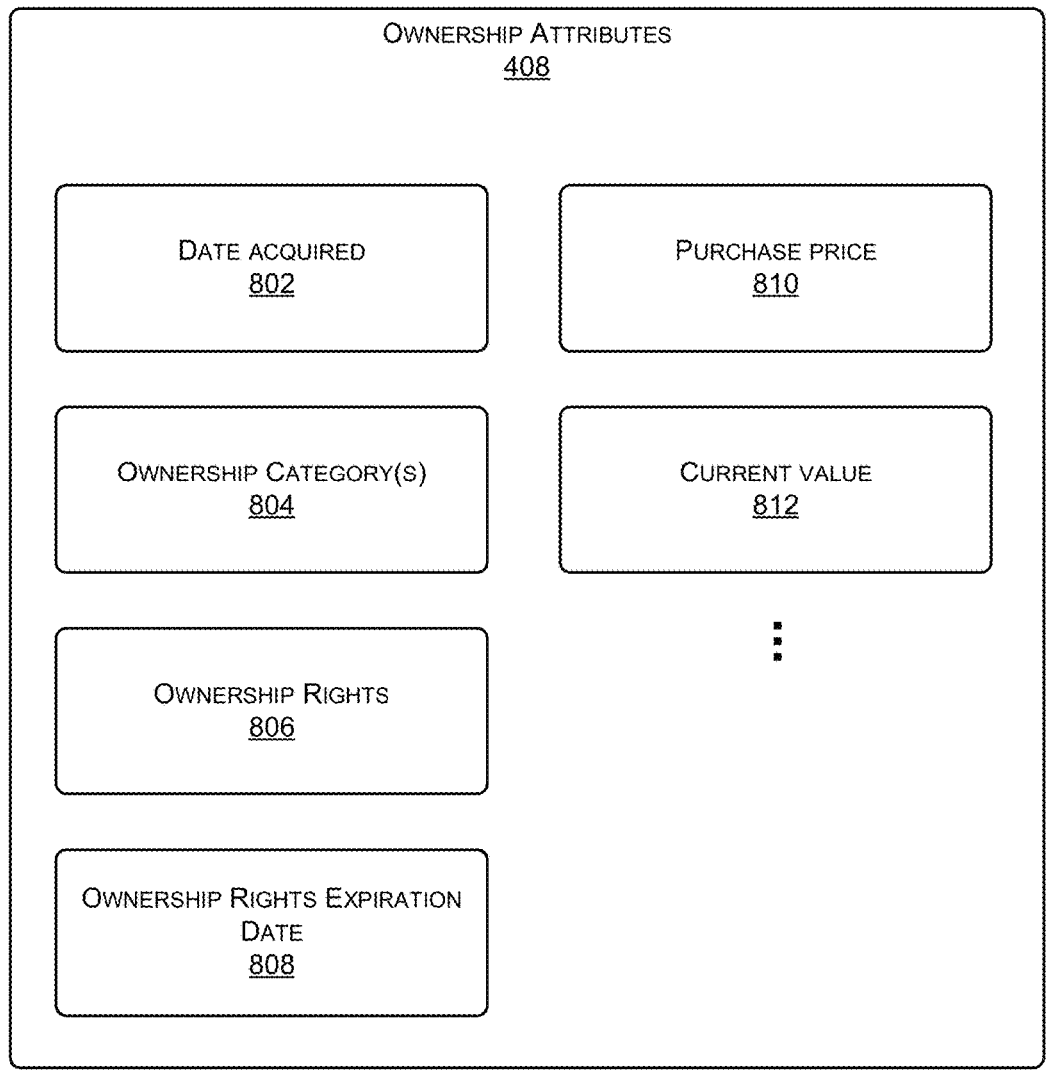
FIG. 8 is an illustrative diagram of ownership attributes in the object datastore in the augmented reality environment.

FIG. 8 is an illustrative diagram of the ownership attributes 408 in the object datastore 114 in the augmented reality environment. Broadly speaking, the ownership attributes comprise property rights associated with the object.

The ownership attributes 408 may include a date acquired 802. The date acquired 802 may be determined by the sensors in the augmented reality environment, transfer of data from merchants or shippers, and so forth.

One or more ownership categories 804 may be specified. These categories may be used to designate if the object was received as a gift, purchased, leased, rented, and so forth.

Ownership rights 806 indicate what property rights are held by a particular user or group of users. These may include particular rights of alienability, such as whether the objects may be sold, rented, leased, performed publicly, and so forth. For example, the ownership rights 806 may include possession but not ownership if the object is being leased or rented from another.

An ownership rights expiration date 808 may be stored which indicates a point in time where the ownership rights will change. For example, access rights to a digital object such as a movie may be temporary and expire after seven days. Or the date when a rental period for a piece of furniture concludes. In some implementations an ownership rights expiration event attribute may also be stored. For example, ownership rights continue until a rental payment is missed.

A purchase price 810 of the object may be maintained. The purchase price 810 may be input manually or received from a shipper, merchant, or other party providing or interacting with the delivery of the object.

A current value 812 of the object may also be stored in the object datastore 114. The current value 812 may be configured to reflect a current market value of the object, the owner's current valuation, and so forth. For example, the market value of the object may be determined by searching for current used sale prices of the same or a similar object in one or more marketplaces.

Additional ownership attributes 408 may also be stored. For example, a list of authorized transferees may be stored which designate to whom an object may be transferred.

Figure 9:
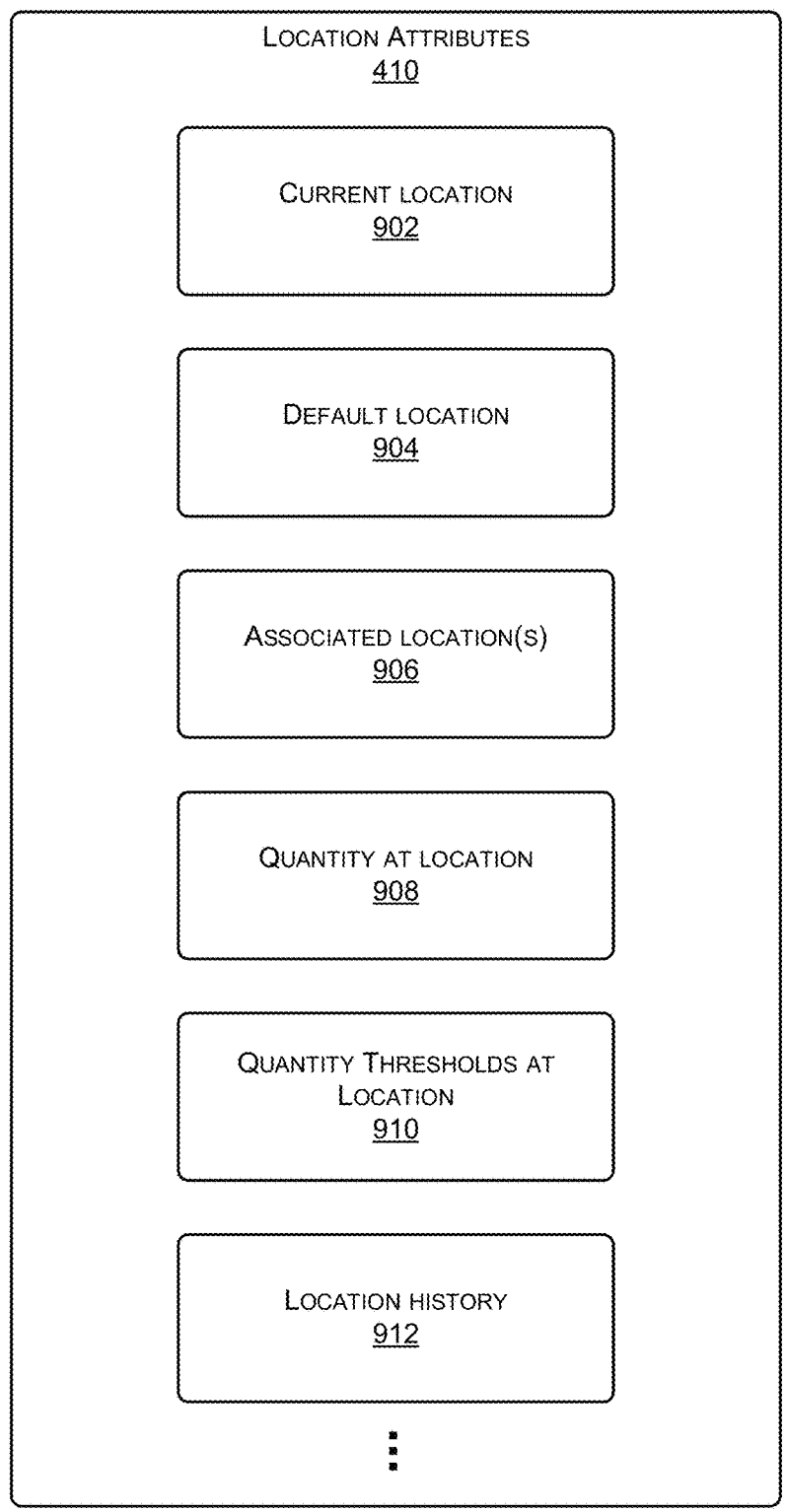
FIG. 9 is an illustrative diagram of location attributes in the object datastore in the augmented reality environment.

FIG. 9 is an illustrative diagram of the location attributes 410 in the object datastore 114 of the augmented reality environment. Generally, the location attributes comprise location data of the object. This location data may be in the augmented reality environment or outside of the environment. As used herein, a location may be specified as an absolute physical location within or outside the augmented reality environment or a relative physical location. For example, an absolute physical location may be that the sunglasses are located at coordinates 3400 mm, −975 mm, 65 mm in a Cartesian coordinate system describing the augmented reality environment encompassing the room. Or an absolute location may be North 48° 57.54' and West 119° 24.72'. In contrast, an example of a relative physical location would be that the sunglasses are on the kitchen counter.

A current location 902 may be stored. For example, the sunglasses at coordinates 3400 mm, −975 mm, 65 mm or on the "kitchen counter" in the augmented reality environment.

A default location 904 may be stored which indicates where the object is typically found or should be stowed. This default location 904 may be pre-loaded, determined via statistical analysis from data in other object datastores 114, defined by a manufacturer, based at least in part on a location history of the object, and so forth. For example, the default location 904 for a medical thermometer is in a medicine cabinet in a master bathroom based on where it is typically stored in that household. In another household, the default location 904 for the medical thermometer may be a medicine cabinet in a bathroom proximate to a child's room.

One or more associated locations 906 may be stored. The associated locations 906 are places where the object is likely to reside. For example, the associated locations 906 for the sunglasses may be in the car, on a table next to the patio, and so forth.

A quantity at a location 908 may be maintained. For example, where the objects are paper towels in a pantry, the quantity of paper towels at that location may be tracked.

A quantity threshold 910 may be designated for a given location, or overall throughout the environment. The quantity threshold 910 indicates what pre-determined quantity has been set to be maintained at that location. For example, a pre-determined minimum of two rolls of paper towels may be set for the pantry.

A location history 912 indicating the location of the object over a period of time may be maintained in the object datastore 114. This location history 912 may have variable levels of resolution in time, space, or both. For example, the augmented reality environment may be configured to maintain the history in ten minute intervals of what room the sunglasses were in, but not necessarily the exact location within the room. The location history 912 data may be used to determine usage patterns of objects.

Figure 10:
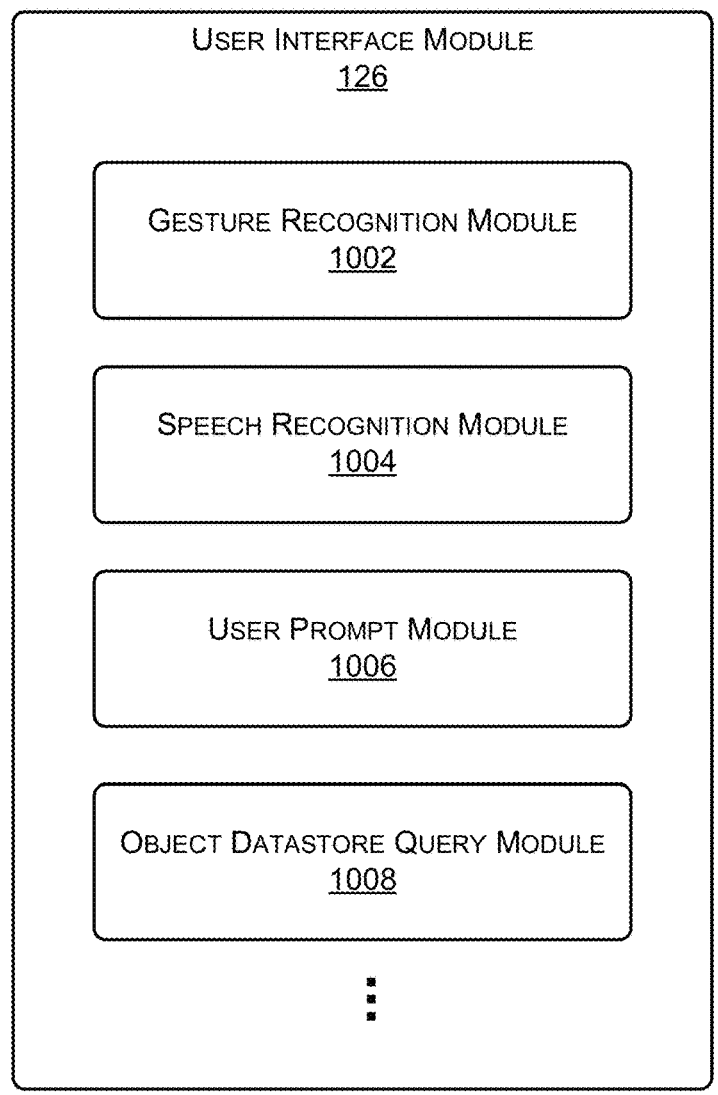
FIG. 10 is a schematic of a user interface module.

FIG. 10 is a schematic of a user interface module 126. As described above, the module 126 is configured to accept and interpret input and generate output for the user. The user interface module 126 may include a gesture recognition module 1002 configured to recognize gestural input. A gesture is a particular pose or sequence of motions made by the user or an object under the user's control within the augmented reality environment. These motions need not be in contact with a touch sensing input device. For example, a user may draw a finger in a particular pattern across the surface of a table or wall. The camera 210 may detect this motion and determine the motions of the user.

In some implementations, the gesture may occur at least in part free from contact with other objects. For example, the gesture may comprise the user extending a pointer finger and touching an object, or vice versa. The gesture need not, but may, call for contact. For example, the gesture may include the user waving a hand, pointing at an object, arranging their fingers in a particular configuration, and so forth.

Some gestures may also include audible elements, such as a user raising a hand and generating a finger snap from the raised hand, or rapping on a wall. Input may also include speech accepted by a speech recognition module 1004. Other forms of input may also be accepted from input devices including keyboards, buttons, pointers, touch sensors, and so forth.

A user prompt module 1006 in the user interface module 126 is configured to generate user prompts such as highlights, pointers, menus, icons, and so forth. For example, the user prompt module 1006 may be configured to present a menu of options to the user. The user prompt module 1006 may generate audible, visual, tactile, or other outputs.

An object datastore query module 1008 is configured to accept user inputs and generate a query of the object datastore 114 including local, cloud, or both. For example, the user may make a hand gesture indicating a query. These queries may be used to determine presence or absence of an object in the environment, in another augmented reality environment, request data about an object, and so forth. For example, a user may wish to know a location of his sunglasses in the environment.

Illustrative Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 11:
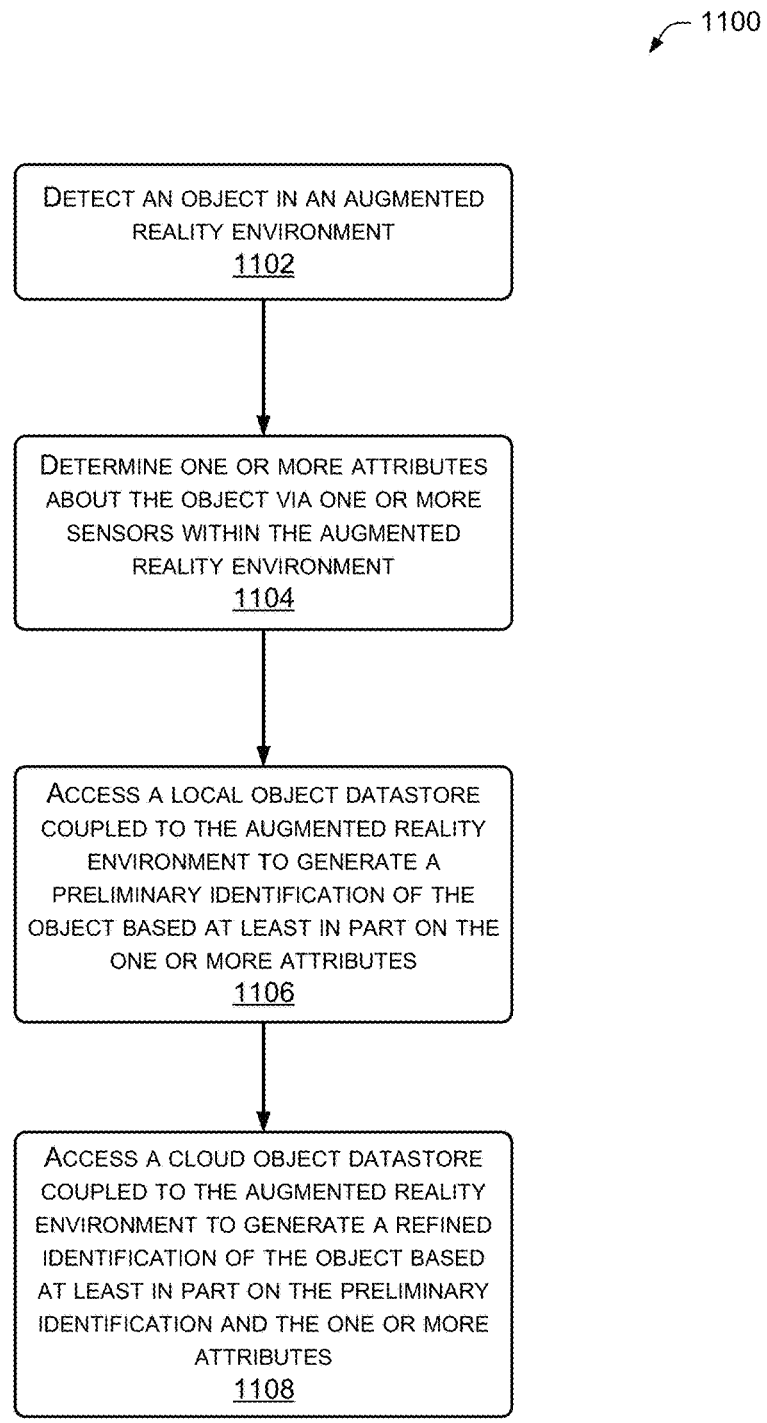
FIG. 11 is an illustrative process of identifying an object in the augmented reality environment.

FIG. 11 is an illustrative process 1100 of identifying an object in the augmented reality environment. At 1102, an object is detected in an augmented reality environment. One or more of the sensors in the ARFN 102 may detect the object. For example, the microphones 218 may detect a sound from the object.

At 1104, one or more attributes are determined about the object via the one or more sensors within the augmented reality environment. For example, the texture 610 of the object may be determined via data obtained by the structured light.

At 1106, a local object datastore 114 coupled to the augmented reality environment is accessed to generate a preliminary identification of the object based at least in part on the one or more attributes. The local object datastore 114 may be stored within the memory 110 in the computing device 104, or accessible via a local area network. The preliminary identification may be made by comparing one or more of the attributes of the detected object with previously stored attributes in the object datastore 114.

At 1108, a cloud object datastore 114 coupled to the augmented reality environment may be accessed to generate a refined identification. This refined identification may be based at least in part on the preliminary identification, the one or more attributes, or both. For example, the preliminary identification may indicate the object is a beverage can, but of an unidentified variety. This preliminary identification may be used to narrow the search in the cloud object datastore 114 to search only beverage cans, reducing the computational requirements for the search.

The cloud object datastore 114 may be stored within the cloud object datastore servers 306. Because of the increased storage and processing capability available within the cloud resource, the cloud object datastore may contain many more attributes for many more items, with those attributes at one or more different resolutions.

As mentioned above, the local and cloud object datastores may be populated with data from several sources. Individual users may identify objects, object attributes may be received from merchants, shippers, manufacturers, and so forth, or the augmented reality environment may be configured to try and determine a preliminary or refined identity. As described below with regards to FIG. 15, in some implementations object attributes may be exchanged between object datastores.

Figure 12:
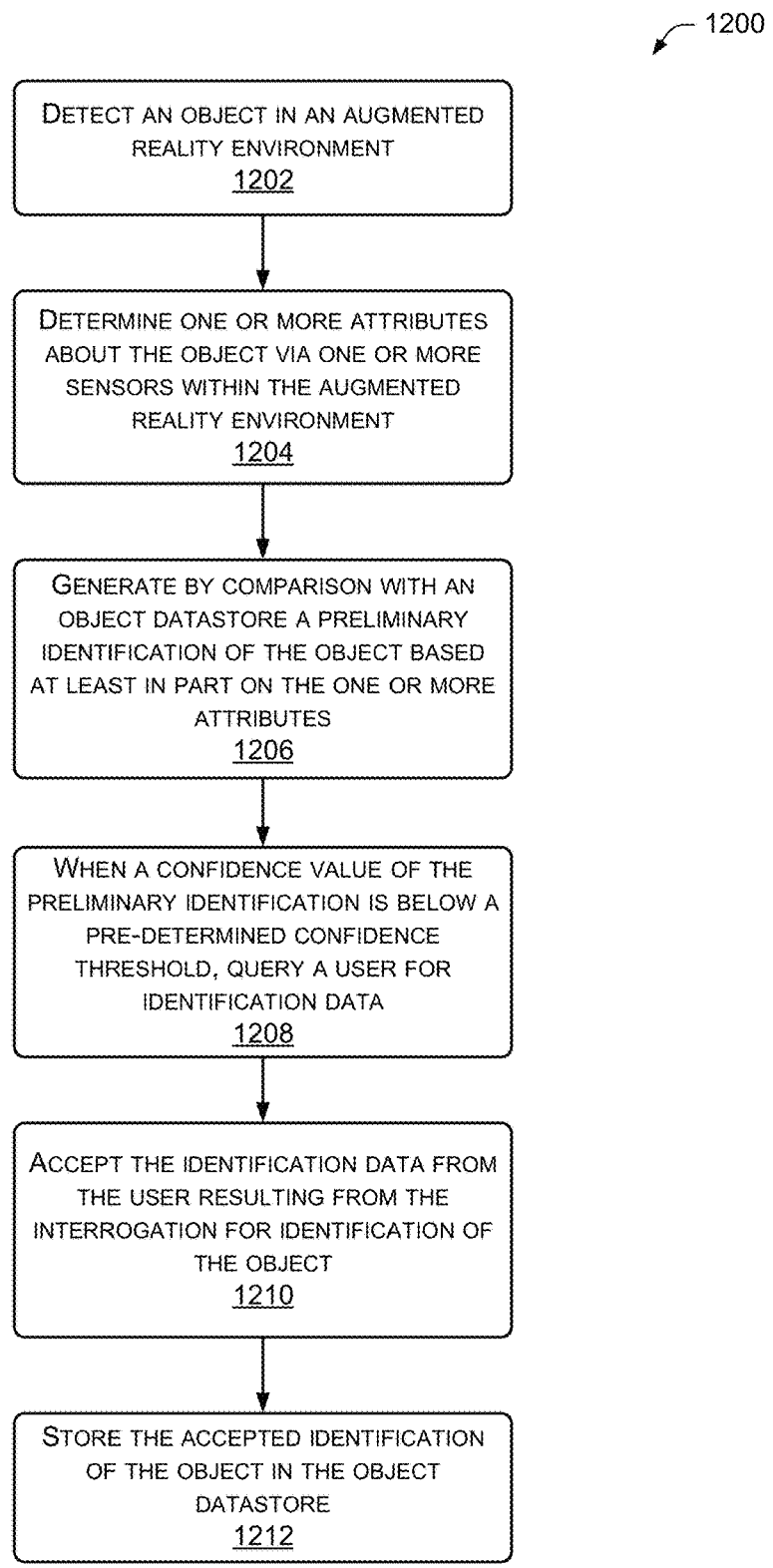
FIG. 12 is an illustrative process of identifying an object in the augmented reality environment by querying a user.

FIG. 12 is an illustrative process 1200 of identifying an object in the augmented reality environment by querying a user. In some situations, the object datastore 114 may be incomplete, or the object detected may be disposed such that the environment is unable to make an identification based on available sensor input.

At 1202, an object is detected in an augmented reality environment, such as by one or more of the sensors in the ARFN 102. At 1204, one or more attributes are determined about the object via the one or more sensors within the augmented reality environment.

At 1206, an object datastore 114 coupled to the augmented reality environment is accessed to generate a preliminary identification of the object based at least in part on the one or more attributes. As above, the preliminary identification may be made by comparing one or more of the attributes of the detected object with previously stored attributes in the object datastore 114.

At 1208, when a confidence value of the preliminary identification is below a pre-determined identification confidence threshold 510 the user is queried for identification data. The identification confidence threshold may be calculated by using one or more weights associated with object characteristics. For example, when the input is ambiguous as to the object characteristics, the associated weights with that data would indicate a level of ambiguity as to the measurement. The interrogation may comprise an audible prompt, visual prompt, tactile prompt, and so forth. For example, a selection indicator designating the detected but unidentified object may be generated. This selection indicator may comprise a visual indicator proximate to or overlapping the unidentified object. For example, a ring, arrow, overlay, audible prompt and so forth may be used to indicate the unidentified object.

In other implementations, audible prompts may also be used in conjunction with the visible prompts. These audible indicators may be configured to have an apparent source proximate to the associated object. For example, an audible prompt may be perceived by the user to come from (or nearby) the object. Or the audible prompt may comprise speech asking about the object such as "what is the object on the table?" A combination of prompts may be used. For example, the selection indicator may highlight the unidentified object while synthesized speech provides audio output asking the user "what is this?"

At 1210, the identification data is accepted from the user resulting from the interrogation for identification of the object. For example, the user may respond "that is a garlic press". In some implementations the environment may further query the user to establish or confirm other attributes such as functional attributes 406. For example, the environment may ask "what do you use a garlic press for?" and the user may respond "when cooking".

The augmented reality environment may be configured to accept the identification data in a variety of ways. In one implementation the identification data may comprise human speech. In another implementation the identification data may comprise a recognized human gesture. For example, the gesture may comprise a letter, word, or phrase in American Sign Language. Or the user may be presented with a list of potential identifications and may be asked to point to the correct identification.

At 1212, the accepted identification of the object is stored in the object datastore 114. This accepted identification as well as object attributes may in turn be provided to other object datastores 114. For example, once that particular garlic press has been identified in an augmented reality user environment, data about that object's attributes may be shared to the cloud object datastore and thus accessible to other users in other augmented reality environments or portions thereof.

Figure 13:
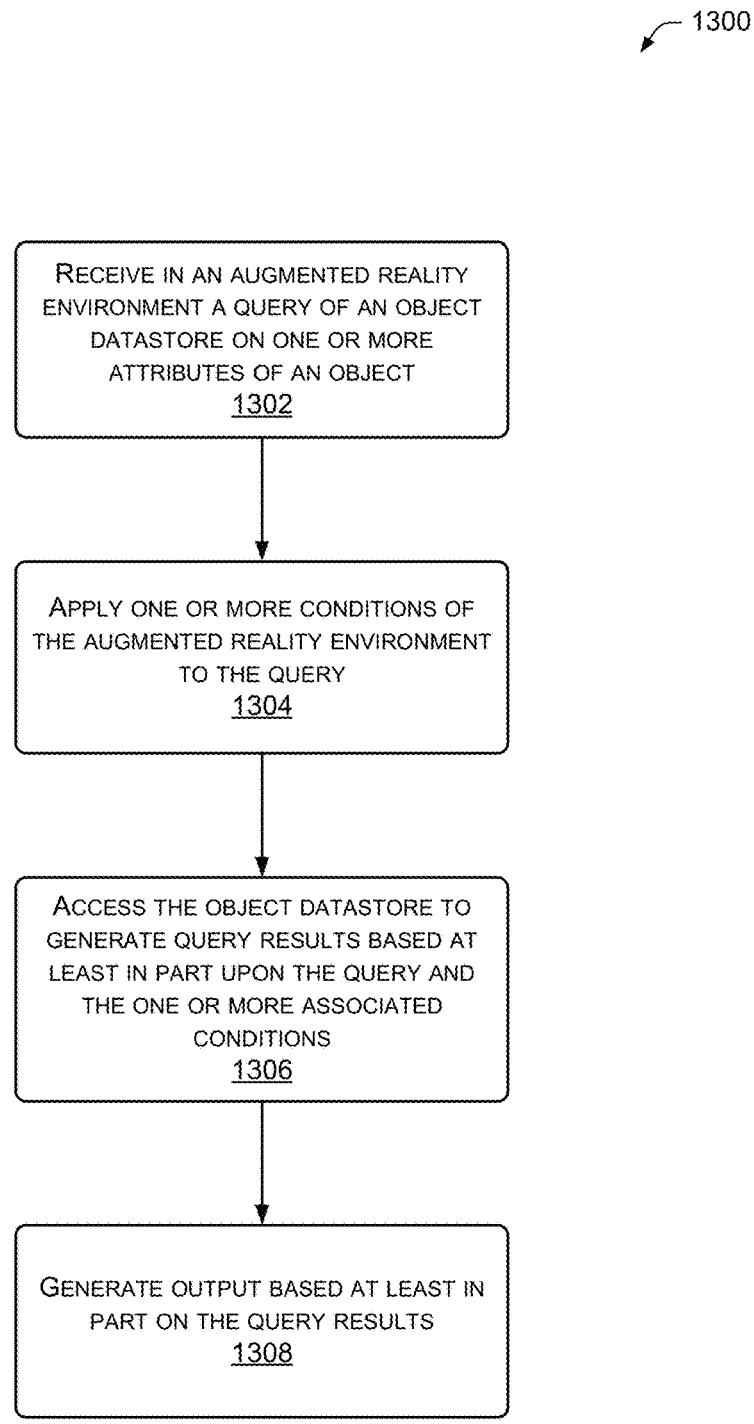
FIG. 13 is an illustrative process of querying the object datastore in the augmented reality environment.

FIG. 13 is an illustrative process 1300 of querying the object datastore 114 in the augmented reality environment. The information in the object datastore 114 may be used in many ways. Users may query the object datastore 114 to find a misplaced item, generate a list of objects for insurance purposes, and so forth. Merchants, product developers, marketers, and other parties may access aggregate and anonymous data such as in the cloud object datastore. This data may be used for marketing, product development, and so forth. For example, a manufacturer may access data indicating that a particular model of toy truck is used for a median of three weeks after acquisition before discard.

At 1302, a query of the object datastore 114 is received in an augmented reality environment. The query may include one or more attributes of an object. For example, the user may query the augmented reality environment to provide an inventory of the items located in a small closet.

At 1304, one or more conditions of the augmented reality environment are applied to the query. These conditions may include limitations based on sensor capabilities, available data, environmental attributes, and so forth. In some implementations, these conditions may be considered to filter the query such that objects which conform to physical realities of the environment are returned by the query, while those which do not are omitted. Continuing the example above, the one or more conditions may include the dimensions of the small closet, object attributes such as size 602, and sensor limitations such as resolution of image data acquired by the camera 210 for an ARFN in view of the small closet.

At 1306, the object datastore 114 is accessed to generate query results based at least in part upon the query and the one or more associated conditions. Continuing the example, the object datastore 114 may be queried to inventory and identify objects detected within the closet. Due to the size limitations of the closet, large pieces of furniture such as sofas, tables, chairs, and so forth may be excluded from the search. The search for identifiable objects may be configured to be limited to objects with an overall volume less than that of the closet and dimensionality such that the object would fit within the closet. By comparing these conditions with the attributes in the object datastore 114 the identification of the objects may be simplified.

In some implementations a tiered or weighted set of conditions may also be applied. For example, the functional attributes 406 of items in the small closet may apply a weighting factor to the query results such that household objects such as linens, towels are searched first and results involving these objects are more likely to be accurate than objects associated with outdoor use such as gardening tools.

At 1308, output based at least in part on the query results may be generated. This generation may comprise compiling, exporting, presenting, and so forth. For example, the inventory of the closet may be projected via the projector 206 onto a wall in the hallway or presented on a handheld computing device.

Figure 14:
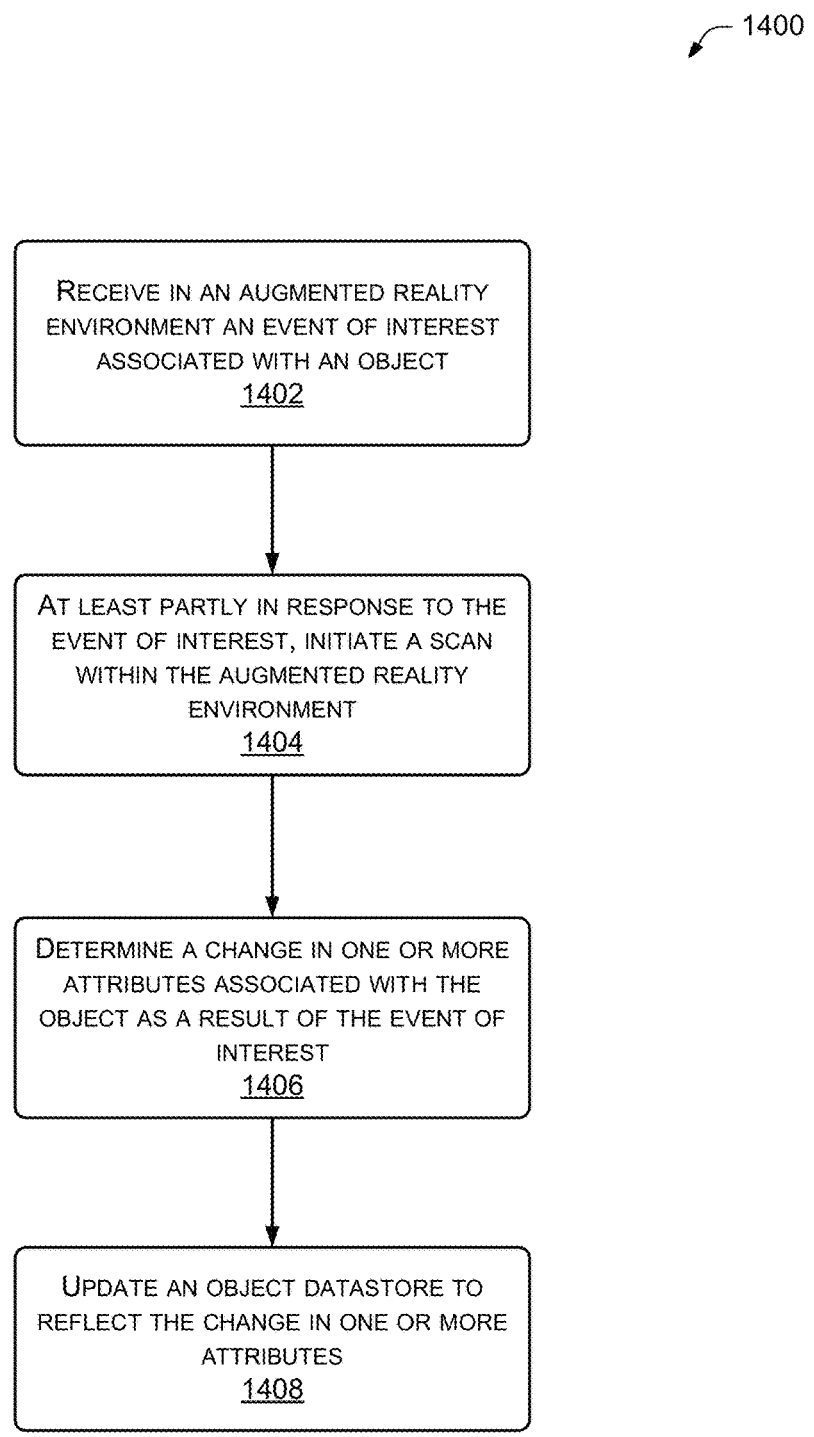
FIG. 14 is an illustrative process of receiving an event of interest and updating a change in one or more attributes about an object in the object datastore.

FIG. 14 is an illustrative process 1400 of receiving an event of interest and updating a change in one or more attributes about an object in the object datastore. An event of interest is an activity which triggers a greater level of scrutiny within the augmented reality environment. For example, an event of interest may comprise an audio signal, gross movement of an object, and so forth. Upon detection of the event of interest, the augmented reality environment may then use one or more sensors to scan at least a portion of the scene. In another implementation, the event of interest may trigger a scan with a higher frequency, resolution, with additional sensors, and so forth.

At 1402, an event of interest associated with an object is received in an augmented reality environment. For example, the transducer 222 and microphone 218 may detect the interacting sound signature 614 of keys on a key ring jingling. This interacting sound signature 614 may be configured as an event of interest.

At 1404, at least partly in response to the event of interest, a scan is initiated within the augmented reality environment. This scan involves the acquisition of data by one or more sensors, configured to survey or view the augmented reality environment. For example, in response to the jingling, the structured light scan may be initiated to track the motion of the keys in the environment.

In some implementations the scan may comprise an increase in the frequency, resolution or both of a scan previously in progress. For example, the structured light scan may increase from a scan interval of five scans per second to sixty scans per second.

During times in the augmented reality environment where little or no activity is taking place, the set of sensors and their associated scan rates, resolution, and so forth may be reduced or discontinued. This may be done to reduce power consumption, minimize computational load, and so forth. For example, in an empty room the ARFN 102 may discontinue use of structured light and rely on audio signals received by the microphones 218 to determine an event of interest, such as a user's footsteps, breathing, opening of a door, and so forth.

At 1406, a change in one or more of the attributes associated with the event of interest is determined. For example, a change in the current location 902 of the keys is determined as a result of the user picking the keys up, causing them to jingle.

At 1408, the object datastore is updated to reflect the changes in the one or more attributes. For example, the current location 902 may now reflect that the keys are now in the garage with the user, and the location history 912 may be updated to show the path of the keys through the house.

As described above with regards to FIG. 10 and the discussion of the object datastore query module 1008, the user may query the object datastore. For example, the user may have gotten distracted while heading to the car and inadvertently misplaced his keys. The user may ask the augmented reality environment via the query module 1008 for the current location of his keys. By searching the object datastore 114 for keys with ownership attributes 408 associated with the querying user and their current location, the environment is able to provide this information.

Figure 15:
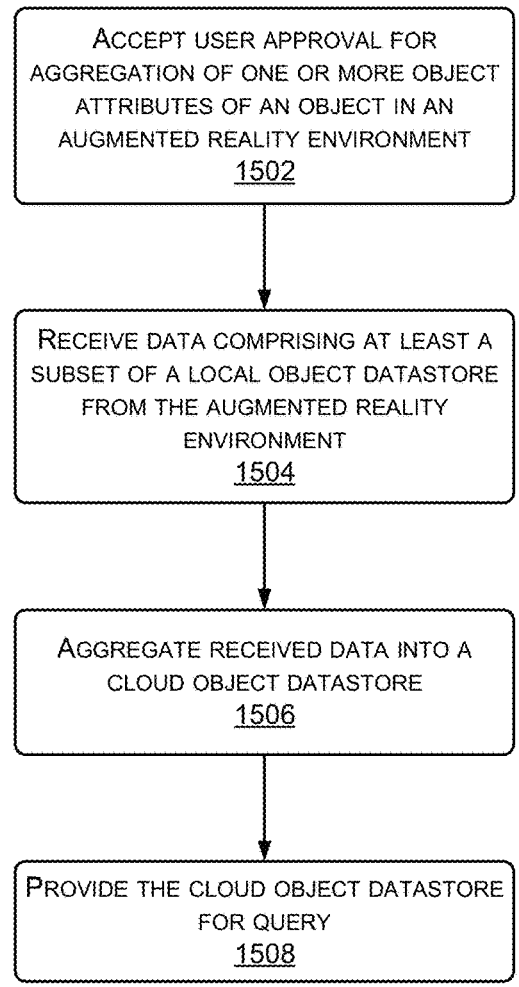
FIG. 15 is an illustrative process of aggregating object datastores.

FIG. 15 is an illustrative process 1500 of aggregating object datastores. The number of objects which may be detected in the unstructured augmented reality environment is staggering. For example, among objects currently sold there are millions of objects with universal product codes (UPC), millions of items with International Article Number, and so forth. Each of these objects may in turn have many attributes as described above. These attributes may range in size from a single bit flag such as the unique flag 506 to many bytes of data such as with a detailed topology 606. In an unstructured augmented reality environment such as a home, business, and so forth, the number of objects which may need to be identified and the corresponding size of the object datastore 114 may rapidly exceed local capabilities for storage and querying. Thus identified object attributes may be aggregated from a plurality of augmented reality environments and merged into the cloud object datastore which may then be accessed.

At 1502, user approval for aggregation of one or more object attributes of an object in an augmented reality environment is accepted. The user approval may comprise an "opt in" to allow anonymous or anonymized data to be collected into the cloud object datastore. In some implementations this user approval may be restricted to users with particular user permissions, such as a designated administrator of the augmented reality environment. In some implementations the collected object attributes relating to particular users, objects, or other criteria may be omitted or prevented from participating in aggregation. For example, a user may choose to not provide identified data about a rare collection of slide rules.

At 1504, data comprising at least a subset of a local object datastore from the augmented reality environment is received. For example, the cloud object datastore servers 306 may receive a set of attributes describing an object which was identified by the user 302 in that user's augmented reality environment, or that user's portion of the augmented reality environment. In some implementations the entire local object datastore may be received.

At 1506, the received data is aggregated into the cloud object datastore. This aggregation may include filtering, checking, verifying, weighing, or otherwise modifying the data. For example, data may be preliminarily aggregated into the cloud object datastore pending confirmation by a trusted user or by cross checking with object attributes of similar identified objects.

At 1508, the cloud object datastore is provided for query. In one implementation, an application programming interface may be maintained allowing applications to access the datastore. As described above, the cloud object datastore may be accessed by a variety of users or entities to address questions relating to the objects and interactions of users at least partly within an augmented reality environment.

The object datastore 114, including local, cloud, or both, provides for a wealth of attributes about physical objects which may be queried in other ways. As described above, these attributes may include dimensions, appearance, shape, position, operating and use characteristics and so forth. By querying the object datastore 114, it is possible to determine changes to objects in the environment. For example, changes in the location attributes 410, in particular changes to the current location 902 over time provide useful information as to use patterns, as well as where the objects has moved to. This information about changes in the object attributes may be used to find a misplaced physical object, determine when the physical object is missing, assist a cognitively impaired individual in recalling what happened to a particular physical object, and so forth.

Figure 16:
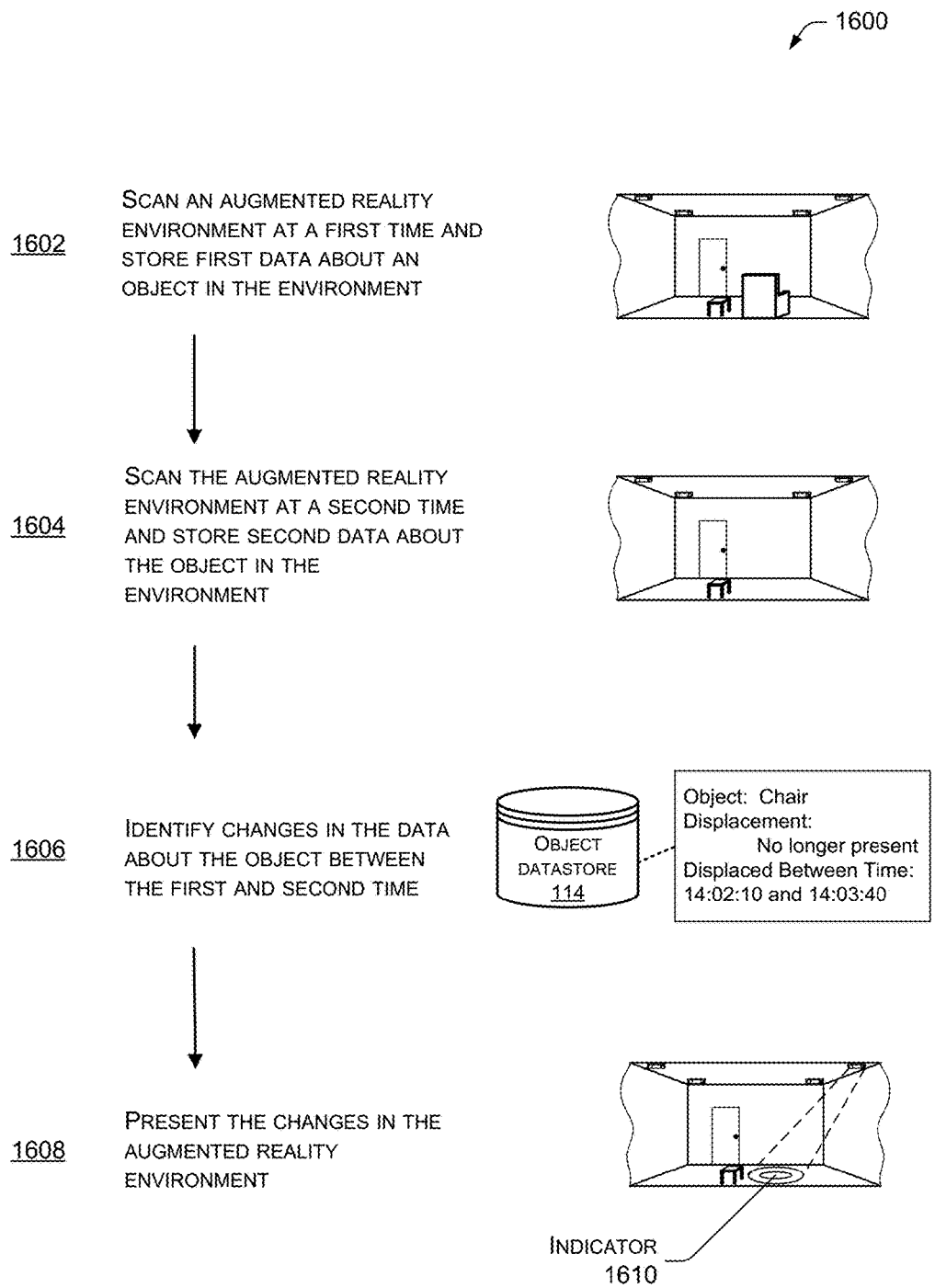
FIG. 16 shows an illustrative process of scanning objects in the augmented reality environment and presenting changes in attributes of those objects from one time to another.

FIG. 16 shows an illustrative process 1600 of storing data in the object datastore about physical objects in the augmented reality environment and presenting data about changes to attributes of those objects over time. The augmented reality module 122 of the augmented reality environment 100 may be configured to store one or more attributes about objects such as described above with regards to FIGS. 4-9. These attributes may be accumulated at particular times, and thus provide a series of "snapshots" of the objects in the augmented reality environment, their movement, disposition, condition, and so forth over time. The attributes in the object datastore 114, and changes to those attributes over time, may be used to provide functionality to users, such as described next.

At 1602, the augmented reality module 122 initiates a scan at a first time to acquire first data about an object in the environment. The first data may then be stored in memory 110. This data comprises the attributes described above with regards to FIGS. 4-9 and produces a "snapshot" of the augmented reality environment at that time. The scan may occur automatically, at a pre-determined interval, or in response to a command of the user. For example, as shown here, the user may be leaving for vacation and initiate a scan locating a chair and table objects in the augmented reality environment 100.

At 1604, the augmented reality module 122 initiates a second scan of the scene at a second time and second data about the object is again stored in the memory 110. This scan may be initiated in the local augmented reality environment 100, at a remote augmented reality environment 100, or by another device. For example, the user may trigger their scan from a smartphone in communication with the augmented reality environment 100. As shown here, the second scan may reveal the table but no chair, due to its removal.

At 1606, changes about the object are identified based on the data. For example, the changes may comprise information indicating that the current location 902 of the chair was in the room at a given time, but at this time is no longer in the room, as well as movement of the table in the location history 912, and so forth.

The changes may be determined at least in part by user input. For example, a pair of images at different times may be presented to the user and a description of a change, if any, is received from the user.

In another implementation, changes may be determined by comparing values of an attribute over time. For example, a query of one or more attributes at different times may be used to identify non-identical values. For example, the current location attribute 902 at time zero is a first set of coordinates while the current location attribute at time two is a second set of coordinates and a third set of coordinates at time three. A query to compare values at time zero and time three would show that the current location attribute 902 is non-identical due to a change in position.

Changes may be determined using attributes at start and end times to look for gross differences, such as the movement from time zero and time three. Intermediate data may also be used to reconstruct a history of changes to the attribute as a function of time. By utilizing this intermediate data, the system may reconstruct a pattern of attribute changes, such as showing in this example that the object was moved to the first set of coordinates, than the second set, then the third set.

In another example where the physical attribute 404 comprises texture 610 and the object of the query is a bouquet of flowers, the change in shape over time resulting from wilting of the flowers may be evident from a query as to changes in the bouquet object's attributes. Thus, a trend in changes to one or more attributes may be used to provide a prediction of or trigger for an event, such as a suggestion to order fresh flowers.

At 1608, the changes are presented in the augmented reality environment 100. Continuing the example above, the user may return from vacation and wish to see what objects may be have been removed or moved. As shown here, an indicator 1610 may be projected on the floor indicating the location of the object showing a change. In some implementations, this indicator 1610 may comprise a picture or other representation of the object. This indicator or other output may thus be used to provide information to the user about what has changed in the environment, such as the removal of the chair as shown here.

Data from the object datastore 114 may also assist users in visualizing and effecting changes in the physical environment as well. The augmented reality system may present a rendering, such as a projection, of a physical object which has attributes stored in the object datastore 114. The rendering may be easily manipulated around in the environment, particularly when compared to having a human physically move the object. Once a particular location of the rendering has been determined, the environment may assist in the placement of the actual physical object upon which the rendering is based. For example, the environment may direct a human delivery person or a robotic device to place a table in a particular spot where the projection of the table placed by the user.

Figure 17:
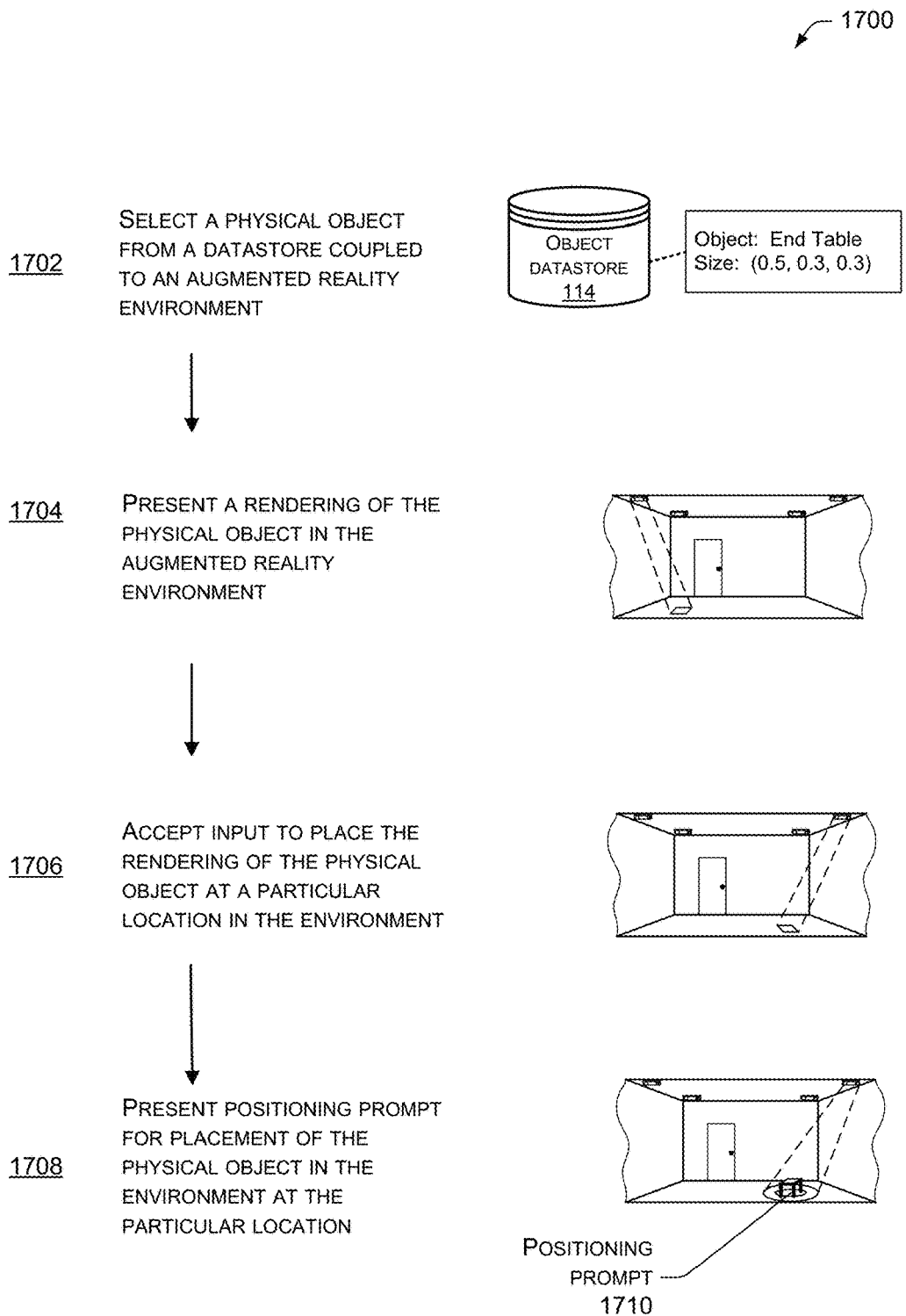
FIG. 17 shows an illustrative process of using renderings of physical objects for their selection and placement within the augmented reality environment.

FIG. 17 shows an illustrative process 1700 of using renderings of physical objects for their selection and placement within the augmented reality environment. The renderings based on data from the object datastore 114 allow the augmented reality environment 100 to assist a user in the selection and placement of physical objects within the environment.

At 1702, a physical object is selected from the object datastore 114 coupled to the augmented reality environment. For example, the table may be selected from the cloud object datastore 114 while the user is shopping, or while accessing a local object datastore containing an inventory of objects located in another room which may also be an augmented reality environment. As mentioned above, the object datastore 114 may include data about the object such as dimensions, shape, imagery, and so forth.

At 1704, a rendering of the physical object is presented in the augmented reality environment 100. For example, the projector 206 of the ARFN 102 may be configured to present a life-size picture of the table. The size and shape of the projected image may be adjusted to account for the user's point-of-view at a position of the user relative to a projected location of the rendering, a direction of gaze, a head position, and so forth. For example, when seated across the room, the user may see projected on the opposing wall an image of the table, scaled such that when viewed by the user it appears to be actual size. Thus, the life-size rendering may be configured to be life-size relative to the user, by projecting at a larger or smaller size to adjust for perspective, relative distance, and so forth.

While a single object is described herein for simplicity of illustration, it is understood that renderings of a plurality of objects may be provided. For example, the user in an unfurnished room may select a couch, chairs, table, painting, and so forth and have renderings of these objects presented.

At 1706, input is accepted to place the rendering of the physical object at a particular location in the environment 100. The input may comprise verbal, gestural, or manually input commands. In some implementations, at least partly in response to the input, the presented rendering may be moved. For example, in one implementation the user may move a hand to "push" the rendering to a new location. Rather than moving a heavy physical object, the user may conveniently and easily move the rendering to experiment with various placements of the physical objects.

At 1708, a positioning prompt 1710 is presented for placement of the physical object in the environment at the particular location. This positioning prompt may include a visual indicator, audio prompt, or combination thereof. Presentation may include projection of an image via the projector 206, presenting text on a display, audible output by the speaker 220, haptic output, transmission of data to a device, and so forth. For example, as shown here, a visual ring may be projected on the floor at the particular location at which the user wanted the table. In another example, verbal or other audible prompts may be provided.

In another implementation, the positioning prompt 1710 may comprise data such as programmatic instructions, vector directions, or other data provided to a portable computing device, robotic device, and so forth. For example, the ARFN 102 may communicate via a wireless interface coupled to the input/output interface 108 with a robotic manipulator to place the table at the particular location.

The positioning prompt 1710 may also be configured to indicate where to place a mount or fastener for securing the physical object to a surface or another object. For example, where the physical object is a painting, a location for where to place a picture hanger on the wall may be indicated.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a processor;
a camera coupled to the processor;
a projector coupled to the processor;
a memory coupled to the processor;
an object datastore stored within the memory; and
instructions stored within the memory that, when executed by the processor, cause the processor to perform acts comprising:
receiving a selection of a representation of a physical object from a datastore of physical objects available for purchase, the datastore of physical objects including a size attribute that corresponds to an actual size of the physical object;
receiving a first selection of a first location on a first surface on which to project a first rendering of the physical object;
presenting, using the projector, the first rendering of the physical object at the first location on the first surface, the first rendering of the physical object depicting the actual size of the physical object from a perspective of a user based at least in part on the size attribute;
receiving a second selection of a second location on a second surface on which to project a second rendering of the physical object; and
presenting, based at least in part on the second selection and using the projector, the second rendering of the physical object at the second location on the second surface, the second rendering of the physical object depicting the actual size of the physical object from the perspective of the user based at least in part on the size attribute.

2. The system of claim 1, the acts further comprising:
obtaining, using the camera, one or more images representing the user,
wherein receiving the second selection of the second location on the second surface on which to project the second rendering comprises detecting, using the one or more images, a gesture made by the user.

3. The system of claim 1, the acts further comprising:
obtaining, using the camera, one or more images representing the user;
detecting, using the one or more images, a position of the user within an environment; and
adjusting a size of the second rendering of the physical object at the second location on the second surface such that the second rendering is depicted as the actual size of the physical object based at least in part on the size attribute and from the position of the user.

4. The system of claim 1, the acts further comprising presenting a positioning prompt indicating placement of the physical object at the second location on the second surface, wherein the positioning prompt comprises at least one of:
one or more visual indicators directing the placement of the physical object; or
one or more audible indicators directing the placement of the physical object.

5. The system of claim 1, the acts further comprising:
determining, from information stored in the catalog datastore of physical objects, a color associated with the physical object,
wherein at least one of presenting the first rendering of the physical object on the first surface or presenting the second rendering of the physical object on the second surface is based at least in part on the color associated with the physical object.

6. The system of claim 1, the acts further comprising storing, in the datastore of physical objects, an attribute that indicates the second location in association with the physical object.

7. The system of claim 1, the acts further comprising:
determining, using the camera or a second camera, a direction of a gaze of the user; and
wherein the first location of the first rendering of the physical object is further based at least in part on the direction of the gaze of the user.

8. The system of claim 1, wherein the receiving the selection of the representation of the physical object from the datastore of physical objects available for purchase is performed based at least in part on an indication to purchase the physical object, the datastore of physical objects available for purchase including one or more additional attributes related to at least one of a price or an availability of the physical object.

9. The system of claim 1, wherein the receiving the selection of the representation of the physical object is performed based at least in part on an indication to purchase the physical object, the datastore of physical objects available for purchase including one or more additional attributes related to a receipt of the physical object at an environment, or an installation the physical object at the environment.

10. The system of claim 1, the acts further comprising:
determining a distance of the user from at least one of the first rendering of the physical object or the second rendering of the physical object; and
wherein the depicting the actual size of the physical object from a perspective of the user is based at least in part on the distance.

11. The system of claim 1, the acts further comprising:
detecting the physical object in an environment;
presenting a positioning prompt directing placement of the physical object at a location within the environment, wherein the positioning prompt comprises at least one of:
one or more visual indicators directing the placement of the physical object; or
one or more audio indicators directing the placement of the physical object.

12. A system comprising:
one or more processors; and
one or more computer-readable storage media storing instructions that, when executed by the one or more processors, cause the one or more processors to perform acts comprising:
receiving a first selection of a representation of a physical object;
determining a size attribute associated with the physical object stored in a datastore of physical objects available for purchase, the size attribute corresponding to an actual size of the physical object;
receiving a second selection of a location on a surface on which to position a rendering of the physical object in an environment, wherein receiving the second selection is based at least in part on detecting a user gesture in proximity to an actual location on an actual surface within the environment; and
presenting, based at least in part on the second selection of the location on the surface, the rendering of the physical object to appear to be at the location on the surface within the environment, the rendering depicting the actual size of the physical object from a user perspective based at least in part on the size attribute.

13. The system of claim 12, the system further comprising a projector, and the acts further comprising presenting, using the projector, a positioning prompt indicating placement of the physical object within the environment at the location, wherein the positioning prompt comprises at least one of one or more visual indicators directing the placement of the physical object.

14. The system of claim 12, the acts further comprising:
determining one or more additional attributes associated with the physical object in the datastore of physical objects available for purchase, the one or more additional attributes including at least one of a color of the physical object, a texture of the physical object, or a topography of the physical object,
wherein presenting the rendering of the physical object is further based at least in part on the one or more additional attributes.

15. The system of claim 12, the acts further comprising:
determining, using a camera, a direction of a gaze of a user associated with the user gesture; and
wherein the location of the rendering of the physical object is further based at least in part on the direction of the gaze of the user.

16. A method comprising:
receiving a first selection of a representation of a physical object;
determining, from a datastore of physical objects available for purchase, an attribute associated with the physical object, comprising at least a size attribute of the physical object that corresponds to an actual size of the physical object;
presenting a first rendering of the physical object to appear to be on a first surface within an environment, the first rendering depicting the actual size of the physical object from a perspective of a user based at least in part on the size attribute;
receiving a second selection of a second location on a second surface to place the first rendering of the physical object at the second location within the environment, wherein the second selection comprises selecting an actual location within the environment; and
presenting, based at least in part on the second selection of the second location on the second surface, a second rendering of the physical object to appear to be on the second surface, the second rendering depicting the actual size of the physical object from the perspective of the user based at least in part on the size attribute.

17. The method of claim 16, wherein receiving the second selection of the second location on the second surface comprises detecting a gesture made by the user in proximity to an actual surface within the environment.

18. The method of claim 16, further comprising presenting, using a projector, a positioning prompt indicating placement of the physical object at the second location on the second surface, the positioning prompt comprising at least one of one or more visual indicators directing the placement of the physical object.

19. The method of claim 16, further comprising:
determining one or more additional attributes associated with the physical object, the one or more additional attributes including at least one of a color of the physical object, a texture of the physical object, or a topography of the physical object,
wherein presenting the second rendering of the physical object to appear to be at the second location on the second surface is based at least in part on the attribute and the one or more additional attributes.

20. The method of claim 16, further comprising storing a second attribute that indicates the second location on the second surface in association with the physical object.

\* \* \* \* \*